US012604009B2

(12) United States Patent
Lee et al.

(10) Patent No.: US 12,604,009 B2
(45) Date of Patent: *Apr. 14, 2026

(54) IMAGE ENCODING/DECODING METHOD AND APPARATUS

(71) Applicants:Electronics and Telecommunications Research Institute, Daejeon (KR); INDUSTRY-UNIVERSITY COOPERATION FOUNDATION KOREA AEROSPACE UNIVERSITY, Goyang-si (KR)

(72) Inventors: Jin Ho Lee, Daejeon (KR); Jung Won Kang, Daejeon (KR); Ha Hyun Lee, Seoul (KR); Sung Chang Lim, Daejeon (KR); Hui Yong Kim, Daejeon (KR); Jae Gon Kim, Goyang-si (KR); Do Hyeon Park, Goyang-si (KR); Ji Hoon Do, Busan (KR); Yong Uk Yoon, Jeju-si (KR)

(73) Assignees: Electronics and Telecommunications Research Institute, Daejeon (KR); INDUSTRY-UNIVERSITY COOPERATION FOUNDATION KOREA AEROSPACE UNIVERSITY, Goyang-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/810,399

(22) Filed: Aug. 20, 2024

(65) Prior Publication Data

US 2024/0414350 A1 Dec. 12, 2024

Related U.S. Application Data

(63) Continuation of application No. 17/611,871, filed as application No. PCT/KR2020/007987 on Jun. 19, 2020, now Pat. No. 12,081,768.

(30) Foreign Application Priority Data

Jun. 21, 2019 (KR) ........................ 10-2019-0074382
Sep. 23, 2019 (KR) ........................ 10-2019-0116640

(51) Int. Cl.
*H04N 19/14* (2014.01)
*H04N 19/12* (2014.01)

(Continued)

(52) U.S. Cl.
CPC ............. *H04N 19/14* (2014.11); *H04N 19/12* (2014.11); *H04N 19/176* (2014.11); *H04N 19/60* (2014.11)

(58) Field of Classification Search
CPC ...... H04N 19/14; H04N 19/12; H04N 19/176; H04N 19/60

(Continued)

(56) References Cited

U.S. PATENT DOCUMENTS

2021/0227260 A1* 7/2021 Lee ........................ H04N 19/60
2021/0235086 A1* 7/2021 Sim ...................... H04N 19/119

FOREIGN PATENT DOCUMENTS

CN 109644281 A 4/2019
KR 1020180025284 A 3/2018

(Continued)

OTHER PUBLICATIONS

Benjamin Bross et al., Versatile Video Coding (Draft 5), JVET-N1001-v7, Joint Video Experts Team (JVET) of ITU-T SG 16 WP 3 and ISO/IEC JTC 1/SC 29/WG 11, 14th Meeting: Geneva, CH, Mar. 19-27, 2019.

(Continued)

*Primary Examiner* — Allen C Wong
(74) *Attorney, Agent, or Firm* — BROADVIEW IP LAW, PC

(57) ABSTRACT

Disclosed herein are an image encoding/decoding method and apparatus. The image decoding method of the present disclosure may include obtaining maximum transform block size information, deriving a maximum transform block size on the basis of the maximum transform block size information, and, determining whether or not a secondary inverse transform is applied to the current block on the basis of the maximum transform block size and a horizontal size and a vertical size of a current block.

3 Claims, 31 Drawing Sheets

(51) Int. Cl.
     *H04N 19/176*        (2014.01)
     *H04N 19/60*         (2014.01)
(58) Field of Classification Search
     USPC ...................................................... 375/240.02
     See application file for complete search history.

(56)                     References Cited

FOREIGN PATENT DOCUMENTS

| | | | |
|----|----------------|-----|--------|
| KR | 1020180085526  | A   | 7/2018 |
| KR | 1020190003950  | A   | 1/2019 |
| WO | 2018/097691    | A2  | 5/2018 |
| WO | 2018/128323    | A1  | 7/2018 |
| WO | 2019/059676    | A1  | 3/2019 |
| WO | 2019/069782    | A1  | 4/2019 |

OTHER PUBLICATIONS

Jeeyoon Park et al., CE6-related: Transform Skip Condition on Transform Block Size, JVET-L0111, Joint Video Experts Team (JVET) of ITU-T SG 16 WP 3 and ISO/IEC JTC 1/SC 29/WG 11, pp. 1-3, 12th Meeting: Macao, CN, Oct. 3-12, 2018.

Jianle Chen et al., Algorithm description for Versatile Video Coding and Test Model 5 (VTM 5), JVET-N1002-v2, Joint Video Experts Team (JVET) of ITU-T SG 16 WP 3 and ISO/IEC JTC 1/SC 29/WG 11, 14th Meeting: Geneva, CH Mar. 19-27, 2019.

Bross, Benjamin et al., "Versatile Video Coding (Draft 9)," Joint Video Experts Team (JVET) of ITU-T SG 16 WP 3 and ISO/IEC JTC 1/SC 29/WG 11. Apr. 2020. doc: JVET-R2001-vA.

\* cited by examiner

0:Planar
1:DC (a)

| amvr_flag | amvr_precision_idx | Resolution | Binary bit |
|---|---|---|---|
| 0 | X | 1/4 | 0 |
| 1 | 0 | 1/2 | 10 |
| | 1 | 1 | 110(111) |
| | 2 | 4 | 111(110) |

(a)

| amvr_flag | amvr_precision_idx | Resolution | Binary bit |
|---|---|---|---|
| 0 | X | 1/4 | 0 |
| 1 | 0 | 1 | 10 |
| | 1 | 1/2 | 110(111) |
| | 2 | 4 | 111(110) |

(b)

| amvr_precision_idx | Resolution | Binary bit |
|---|---|---|
| 0 | 1/4 | 0 |
| 1 | 1/2 | 10 |
| 2 | 1 | 110(111) |
| 3 | 4 | 111(110) |

(c)

| amvr_precision_idx | Resolution | Binary bit |
|---|---|---|
| 0 | 1/4 | 0 |
| 1 | 1/2 | 10 |
| 2 | 1 | 110(111) |
| 3 | 4 | 111(110) |

| amvr_flag | amvr_precision_idx | Resolution | Binary bit |
|-----------|--------------------|------------|-----------|
| 0 | X | 1/4 | 0 |
| 1 | 0 | 1/16 | 10(11) |
|   | 1 | 1 | 11(10) |

(a)

| amvr_flag | amvr_precision_idx | Resolution | Binary bit |
|-----------|--------------------|------------|-----------|
| 0 | X | 1/4 | 0 |
| 1 | 0 | 1/16 | 10 |
|   | 1 | 1 | 110(111) |
|   | 2 | 1/8 or 1/2 or 2 | 111(110) |

(b)

| amvr_flag | amvr_precision_idx | Resolution | Binary bit |
|-----------|--------------------|------------|-----------|
| 0 | X | 1/4 | 0 |
| 1 | 0 | 1 | 10 |
|   | 1 | 1/16 | 110(111) |
|   | 2 | 1/8 or 1/2 or 2 | 111(110) |

(c)

| amvr_flag | amvr_precision_idx | Resolution | Binary bit |
|-----------|--------------------|------------|-----------|
| 0 | X | 1/4 | 0 |
| 1 | 0 | 1/8 or 1/2 or 2 | 10 |
|   | 1 | 1/16 | 110(111) |
|   | 2 | 1 | 111(110) |

| Resolution | AMVR flag | Integer motion vector resolution flag | Extra motion vector resolution index |
|:---:|:---:|:---:|:---:|
| 1/4 | 1 | | |
| 1/2 | 0 | 1 | |
| 1 | 0 | 0 | 1(0) |
| 4 | 0 | 0 | 1(0) |

FIG. 33

| Resolution | AMVR flag | Integer motion vector resolution flag |
|------------|-----------|---------------------------------------|
| 1/4 | 1 | |
| 1/16 | 0 | 1(0) |
| 1 | 0 | 0(1) |

(a)

| Resolution | AMVR flag | Integer motion vector resolution flag | Extra motion vector resolution index |
|------------|-----------|---------------------------------------|--------------------------------------|
| 1/4 | 1 | | |
| 1/16 | 0 | 1 | |
| 1 | 0 | 0 | 1(0) |
| 2 | 0 | 0 | 0(1) |

(b)

| Resolution | AMVR flag | Integer motion vector resolution flag | Extra motion vector resolution index |
|------------|-----------|---------------------------------------|--------------------------------------|
| 1/4 | 1 | | |
| 1 | 0 | 0 | |
| 1/2 or 1/8 | 0 | 1 | 1(0) |
| 1/16 | 0 | 1 | 0(1) |

Figure 34:
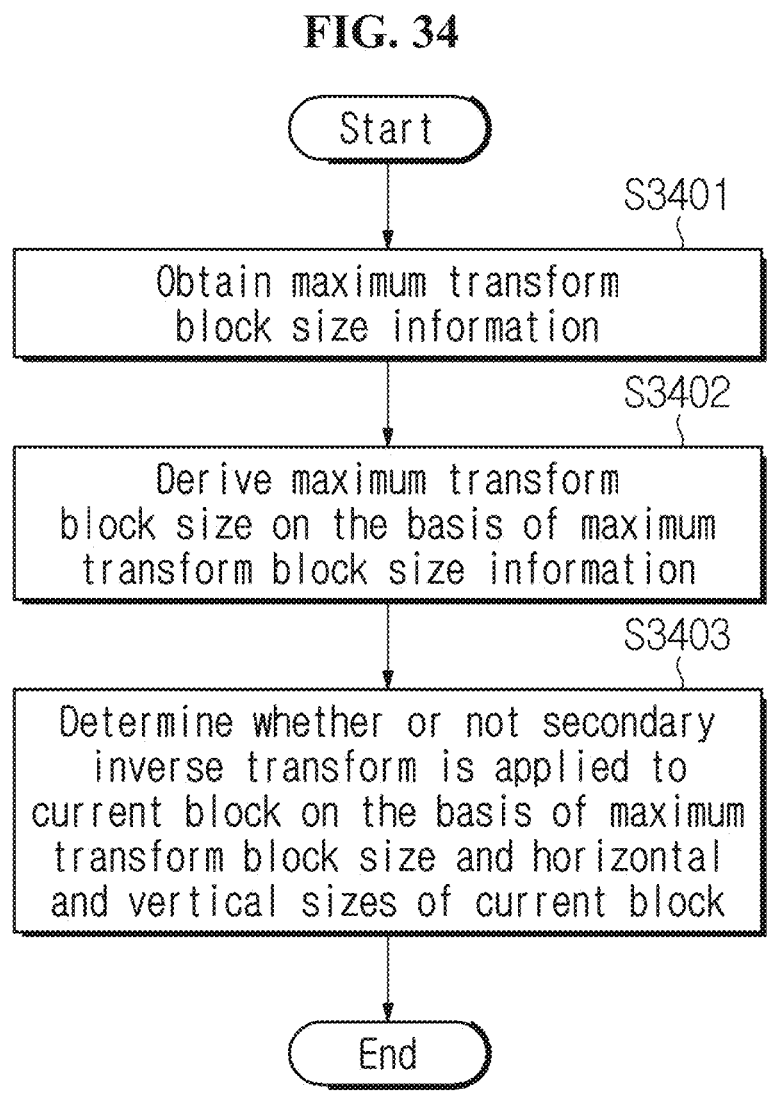

```
                    ┌─────────┐
                    │  Start  │
                    └────┬────┘
                         │                    S3401
                         ▼
    ┌────────────────────────────────────────┐
    │        Obtain maximum transform         │
    │          block size information         │
    └────────────────────┬───────────────────┘
                         │                    S3402
                         ▼
    ┌────────────────────────────────────────┐
    │        Derive maximum transform         │
    │   block size on the basis of maximum    │
    │     transform block size information    │
    └────────────────────┬───────────────────┘
                         │                    S3403
                         ▼
    ┌────────────────────────────────────────┐
    │   Determine whether or not secondary    │
    │     inverse transform is applied to     │
    │  current block on the basis of maximum  │
    │    transform block size and horizontal  │
    │   and vertical sizes of current block   │
    └────────────────────┬───────────────────┘
                         │
                         ▼
                    ┌─────────┐
                    │   End   │
                    └─────────┘
```

IMAGE ENCODING/DECODING METHOD AND APPARATUS

CROSS-REFERENCE TO RELATED APPLICATIONS

The present application is a continuation application of U.S. application Ser. No. 17/611,871, filed on Nov. 16, 2021, which was the National Stage of International Application No. PCT/KR2020/007987, filed on Jun. 19, 2020, which claims priority to Korean Patent Application No. 10-2019-0074382, filed on Jun. 21, 2019, and Korean Patent Application No. 10-2019-0116640, filed on Sep. 23, 2019, with the Korean Intellectual Property Office, which are incorporated herein by reference in their entirety.

TECHNICAL FIELD

The present invention relates to a method and apparatus for image encoding/decoding and a recording medium for storing a bitstream. More particularly, the present invention relates to a transform and quantization method for a residual signal and a method and apparatus for transform coefficient entropy encoding/decoding.

BACKGROUND ART

Recently, the demand for high resolution and quality images such as high definition (HD) or ultra-high definition (UHD) images has increased in various applications. As the resolution and quality of images are improved, the amount of data correspondingly increases. This is one of the causes of increase in transmission cost and storage cost when transmitting image data through existing transmission media such as wired or wireless broadband channels or when storing image data. In order to solve such problems with high resolution and quality image data, a high efficiency image encoding/decoding technique is required.

There are various video compression techniques such as an inter prediction technique of predicting the values of pixels within a current picture from the values of pixels within a preceding picture or a subsequent picture, an intra prediction technique of predicting the values of pixels within a region of a current picture from the values of pixels within another region of the current picture, a transform and quantization technique of compressing the energy of a residual signal, and an entropy coding technique of allocating frequently occurring pixel values with shorter codes and less occurring pixel values with longer codes.

In video encoding, encoding of a transform coefficient may be performed to transform a residual signal, that is, a difference between an original signal and a prediction signal is transformed into a different basis and to quantized a corresponding coefficient. In video decoding, such a quantized transform coefficient may be decoded and inverse-transformed to derive a decoded residual signal, and a decoded signal may be generated by adding the residual signal and a prediction signal.

After a final transform coefficient is generated by performing a secondary transform for a low-frequency domain of a primary-transformed transform coefficient, encoding for a quantization level may be performed by quantizing the corresponding transform coefficient.

Secondary transform information may be encoded/decoded at the end of a coding unit. When a current coding block is larger than a maximum transform block or a video processing and distribution unit (VPDU), the coding unit may be divided to a transform block size. In this case, a first split block may be delayed until a final block that is split to obtain secondary transform information is processed. Furthermore, this requires up to four times longer data buffering.

In addition, although a secondary transform may reduce a signaling overhead for a transform coefficient, since additional quantization is performed for a low-frequency domain, the subjective image quality may be degraded. Accordingly, the subjective image quality may be especially degraded for a large coding block where a low-frequency domain is emphasized.

DISCLOSURE

Technical Problem

An object of the present invention is to provide an image encoding/decoding method for solving a parsing delay until a final split block is processed to obtain secondary transform information generated by secondary transform and solving a data buffering problem that lasts up to four times longer to store data.

Another object of the present invention is to provide a recording medium storing a bitstream generated by a video encoding/decoding method or apparatus of the present invention.

Technical Solution

A method of decoding an image according to the present invention, the method may comprise, obtaining maximum transform block size information; deriving a maximum transform block size on the basis of the maximum transform block size information; and determining whether or not a secondary inverse transform is applied to the current block on the basis of the maximum transform block size and a horizontal size and a vertical size of a current block.

In the method of decoding an image according to the present invention, wherein the determining of whether or not the secondary inverse transform is applied comprises determining whether or not the secondary inverse transform is applied to the current block on the basis of a larger value of the horizontal size and the vertical size of the current block.

In the method of decoding an image according to the present invention, wherein the determining of whether or not the secondary inverse transform is applied comprises determining that the secondary inverse transform is not applied to the current block, when the larger value of the horizontal size and the vertical size of the current block is greater than the maximum transform block size.

In the method of decoding an image according to the present invention, wherein the determining of whether or not the secondary inverse transform is applied comprises determining whether or not the secondary inverse transform is applied to the current block on the basis of primary inverse transform information of the current block.

In the method of decoding an image according to the present invention, wherein the determining of whether or not the secondary inverse transform is applied comprises determining that the secondary inverse transform is not applied to the current block, when the primary inverse transform information of the current block indicates a primary inverse transform skip mode.

A method of encoding an image according to the present invention, the method may comprise, determining a maximum transform block size; encoding maximum transform block size information indicating the maximum transform block size; and determining whether or not a secondary inverse transform is applied to the current block on the basis of the maximum transform block size and a horizontal size and a vertical size of a current block.

In the method of encoding an image according to the present invention, wherein the determining of whether or not the secondary inverse transform is applied comprises determining whether or not the secondary inverse transform is applied to the current block on the basis of a larger value of the horizontal size and the vertical size of the current block.

In the method of encoding an image according to the present invention, wherein the determining of whether or not the secondary inverse transform is applied comprises determining that the secondary inverse transform is not applied to the current block, when the larger value of the horizontal size and the vertical size of the current block is greater than the maximum transform block size.

In the method of encoding an image according to the present invention, wherein the determining of whether or not the secondary inverse transform is applied comprises determining whether or not the secondary inverse transform is applied to the current block on the basis of primary inverse transform information of the current block.

In the method of encoding an image according to the present invention, wherein the determining of whether or not the secondary inverse transform is applied comprises determining that the secondary inverse transform is not applied to the current block, when the primary inverse transform information of the current block indicates a primary inverse transform skip mode.

A computer-readable recording medium according to the present invention may store a bitstream generated by an image encoding method according to the present invention.

Advantageous Effects

As the present invention performs transform information encoding/decoding at the end of a transform unit in order to solve a parsing delay until a final split block is processed for obtaining second transform information generated by secondary transform and to solve a data buffering problem that lasts up to four times longer to store data, independence between transform blocks may be maintained.

Even when a single coding block is split into a plurality of transform blocks, since the present invention is capable of deriving secondary transform information for each block and independence from other blocks is generated, delay may be prevented and data buffering may be maintained.

As the present invention enables encoding/decoding to be performed only for a single piece of secondary transform information in each coding block, coding complexity or signaling overhead may be reduced.

As the present invention limits secondary transform for a large-size coding block, the subjective image quality of a reconstructed picture may be improved.

When performing secondary transform for a residual signal, the present invention may minimize data buffering and parsing delay in the secondary transform by performing efficient entropy encoding/decoding for the secondary transform.

In addition, according to the present invention, a recording medium for storing a bitstream generated by an image encoding/decoding method or apparatus of the present invention may be provided.

In addition, according to the present invention, image encoding and decoding efficiency may be improved.

DESCRIPTION OF DRAWINGS

FIGS. 21 to 23 are views for explaining transform result zeroing.

FIG. 30 is a view for explaining transmittance and entropy encoding/decoding of an adaptive motion vector resolution index for an AMVP mode.

FIG. 31 is a view for explaining transmittance and entropy encoding/decoding of an adaptive motion vector resolution index for an affine mode.

FIG. 32 is a view for explaining transmittance and entropy encoding/decoding of a resolution set for an AMVP mode.

FIG. 33 is a view for explaining transmittance and entropy encoding/decoding of a resolution set for an affine mode.

FIG. 34 is a view of a flowchart showing an image decoding method according to an embodiment of the present invention.

MODE FOR INVENTION

Figure 1:
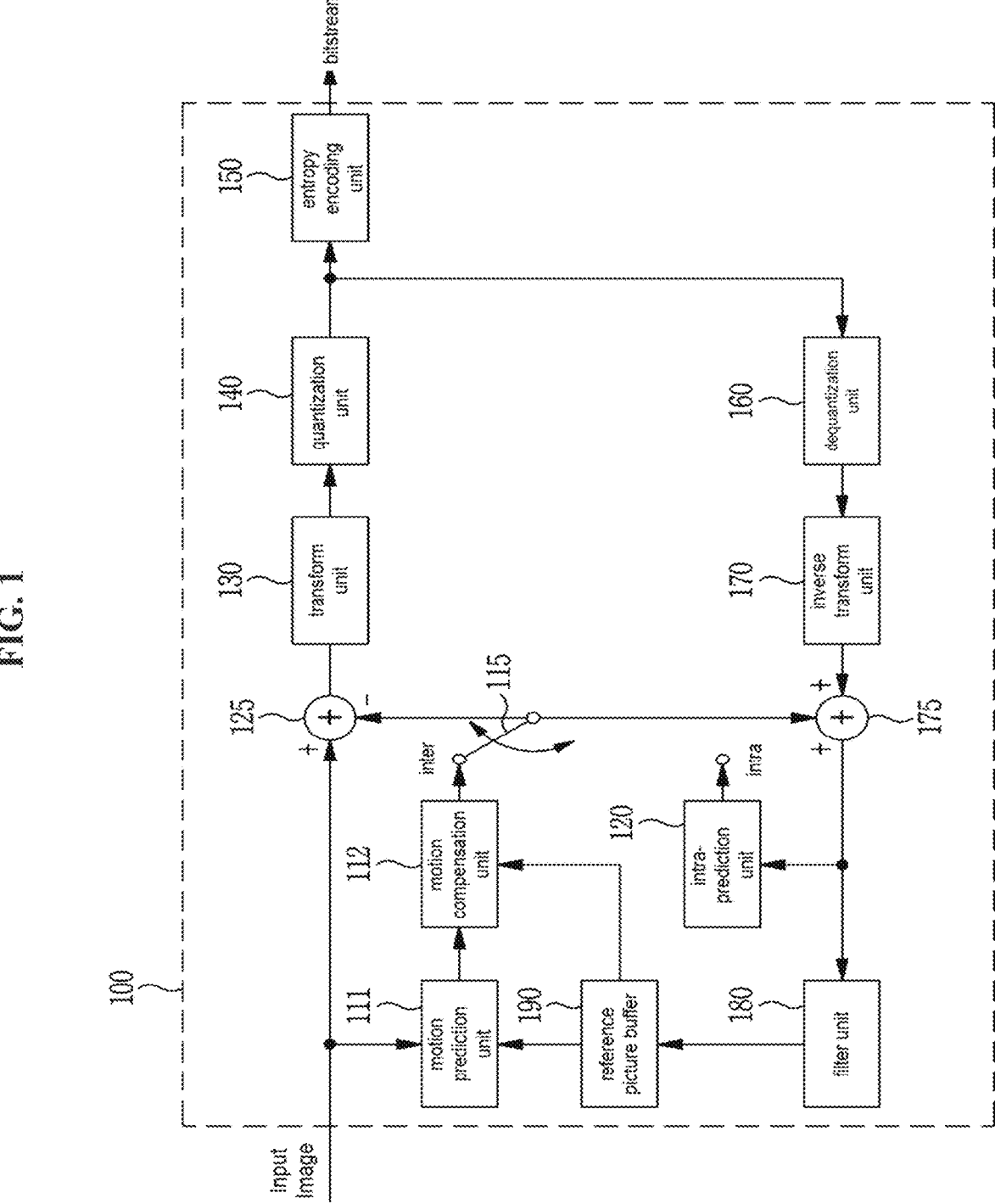
FIG. 1 is a block diagram showing a configuration of an encoding apparatus according to an embodiment to which the present invention is applied.

The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quarternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

An adaptation parameter set may mean a parameter set that can be shared by being referred to in different pictures, subpictures, slices, tile groups, tiles, or bricks. In addition, information in an adaptation parameter set may be used by referring to different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a slice, a tile group, a tile, or a brick inside a subpicture.

In addition, regarding the adaptation parameter set, different adaptation parameter sets may be referred to by using identifiers of different adaptation parameter sets for a tile or a brick inside a slice.

In addition, regarding the adaptation parameter set, different adaptation parameter sets may be referred to by using identifiers of different adaptation parameter sets for a brick inside a tile.

Information on an adaptation parameter set identifier may be included in a parameter set or a header of the subpicture, and an adaptation parameter set corresponding to the adaptation parameter set identifier may be used for the subpicture.

The information on the adaptation parameter set identifier may be included in a parameter set or a header of the tile, and an adaptation parameter set corresponding to the adaptation parameter set identifier may be used for the tile.

The information on the adaptation parameter set identifier may be included in a header of the brick, and an adaptation parameter set corresponding to the adaptation parameter set identifier may be used for the brick.

The picture may be partitioned into one or more tile rows and one or more tile columns.

The subpicture may be partitioned into one or more tile rows and one or more tile columns within a picture. The subpicture may be a region having the form of a rectangle/square within a picture and may include one or more CTUs. In addition, at least one or more tiles/bricks/slices may be included within one subpicture.

The tile may be a region having the form of a rectangle/square within a picture and may include one or more CTUs. In addition, the tile may be partitioned into one or more bricks.

The brick may mean one or more CTU rows within a tile. The tile may be partitioned into one or more bricks, and each brick may have at least one or more CTU rows. A tile that is not partitioned into two or more may mean a brick.

The slice may include one or more tiles within a picture and may include one or more bricks within a tile.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, a coding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive in-loop filter, an adaptive in-loop filter coefficient, an adaptive in-loop filter tab, an adaptive in-loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive in-loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive in-loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
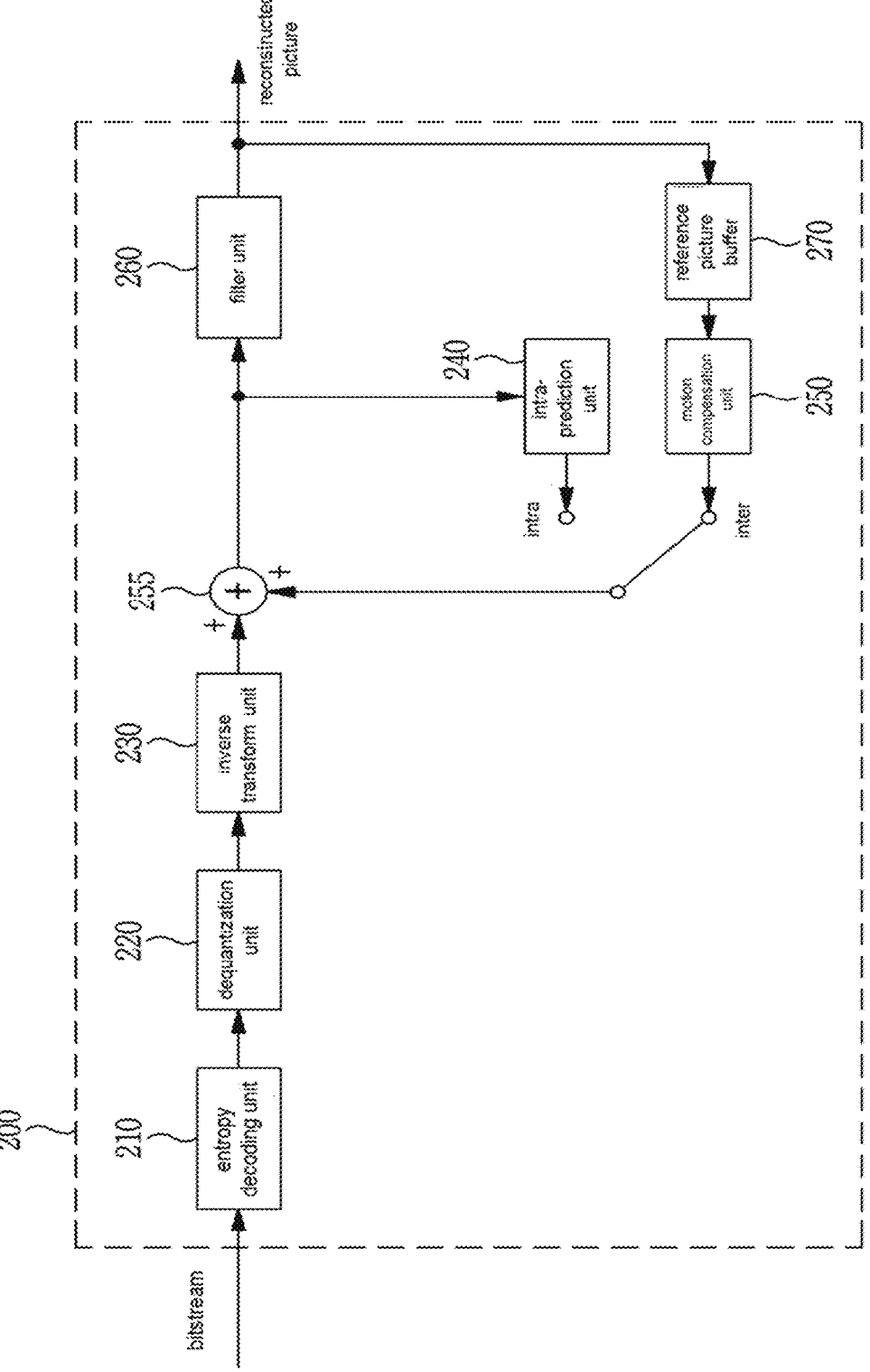
FIG. 2 is a block diagram showing a configuration of a decoding apparatus according to an embodiment and to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a onedirectional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive in-loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
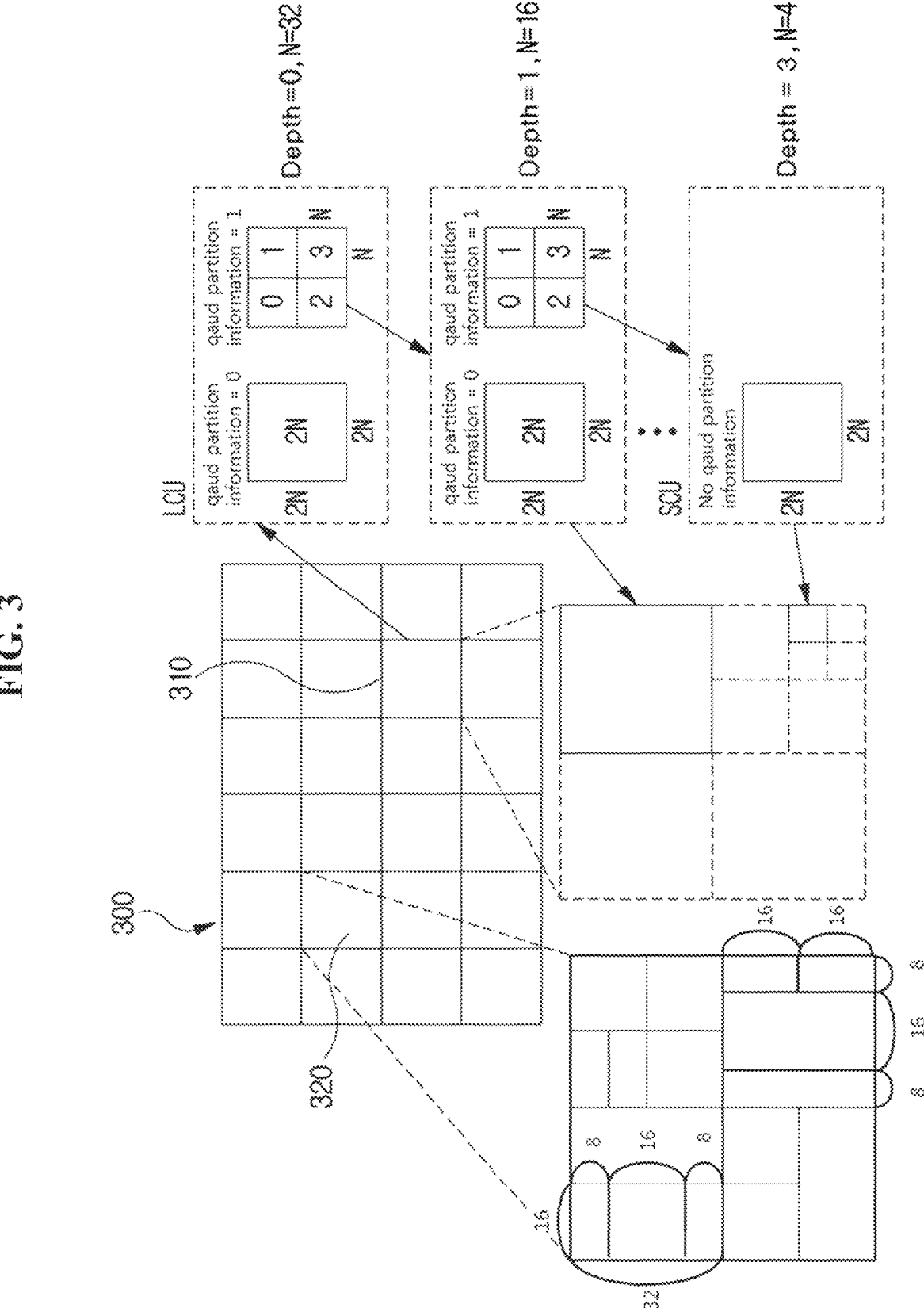
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and an LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (height) of the coding unit is larger than the vertical size (height) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
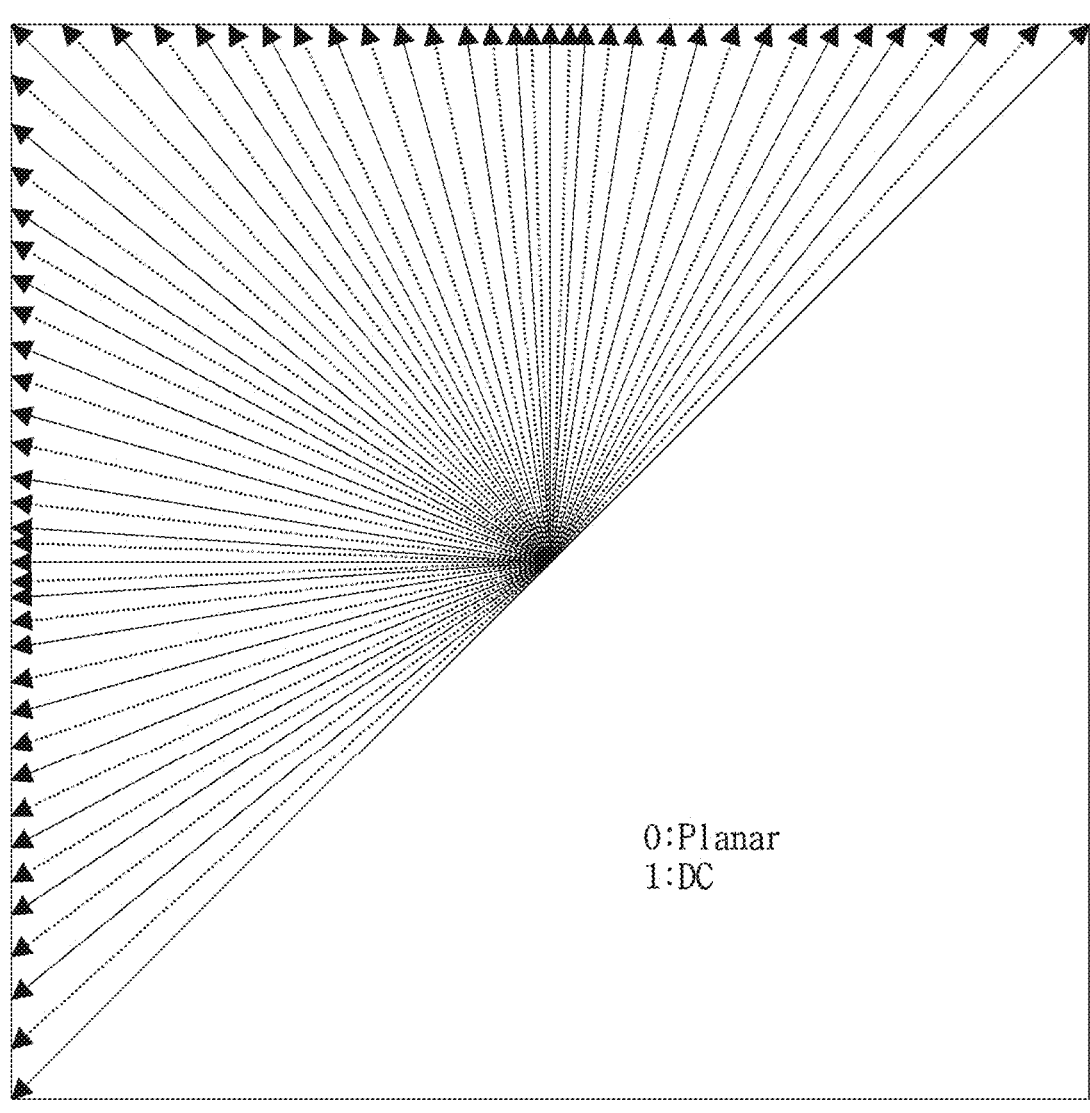
FIG. 4 is a view showing an intra-prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using a coding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
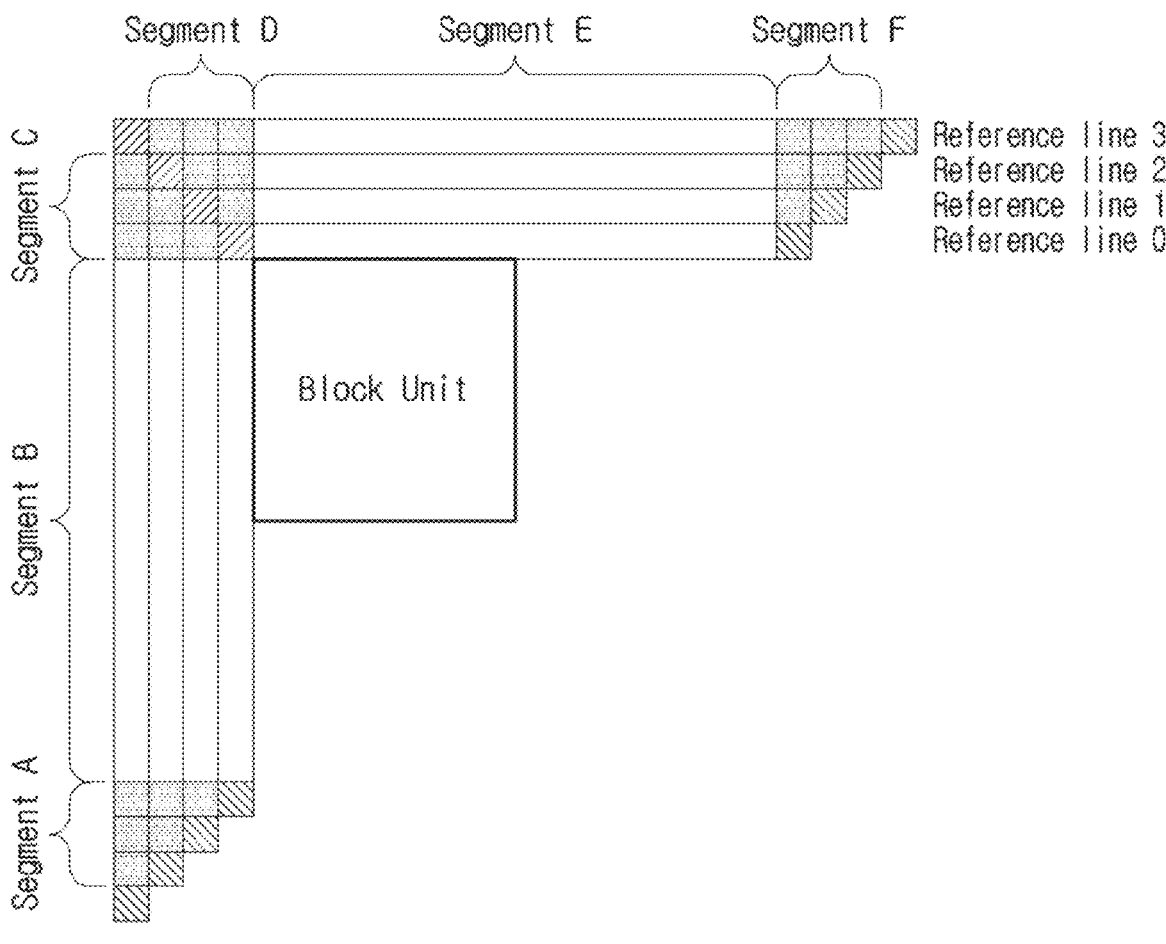
FIG. 7 is a diagram illustrating reference samples capable of being used for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. For example, in FIG. 7, reference sample line indicators 0, 1, and 2 may be signaled as index information indicating reference sample lines 0, 1 and 2. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto.

For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
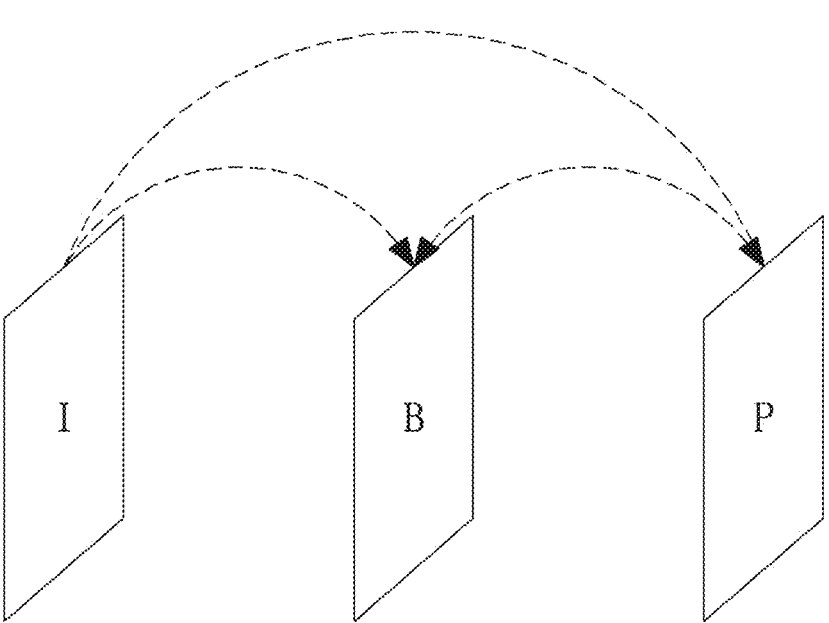
FIG. 5 is a diagram illustrating an embodiment of an inter-picture prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a geometric partitioning mode, a combined inter intra prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The geometric partitioning mode may mean a mode that derives motion information by partitioning the current block into the predefined directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
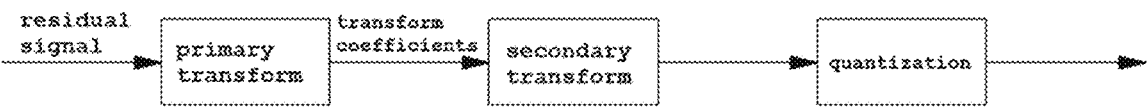
FIG. 6 is a diagram illustrating a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Hereinafter, an image encoding/decoding method according to the present invention will be described.

Figure 8:
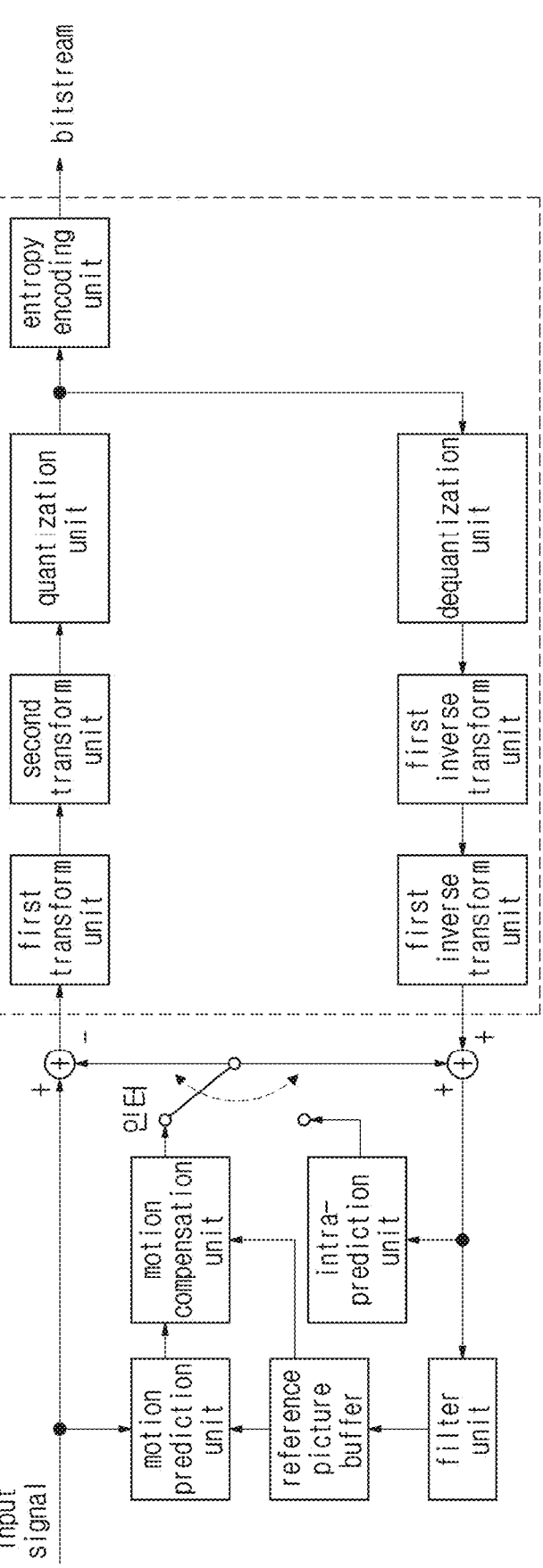
FIG. 8 is a view showing an image encoding apparatus according to an embodiment of the present invention.

FIG. 8 is a view showing an image encoding apparatus according to an embodiment of the present invention.

Referring to FIG. 1 and FIG. 8, a transform unit 130 of FIG. 1 may consist of a first transform unit and a second transform unit, and an inverse transform unit 170 of FIG. 1 may consist of a first inverse transform unit and a second inverse transform unit. Here, first transform, first inverse transform, second transform, and second inverse transform may mean primary transform, primary inverse transform, secondary transform, and secondary inverse transform, respectively.

An input signal of a first transform unit may be a residual signal that is generated by subtraction between an original image signal and a prediction image signal. A first transform unit may perform a first transform for an input signal and output a corresponding result. Meanwhile, a first transform unit may skip a first transform.

An input signal of a second transform unit may be an output signal of a first transform unit. A second transform unit may perform a second transform for an input signal and output a corresponding result. Meanwhile, a second transform unit may skip a second transform.

An input signal of a quantization unit may be an output signal of a second transform unit. A quantization unit may perform quantization for an input signal and output a corresponding result (quantization level).

An entropy encoding unit may perform entropy encoding for an output signal of a quantization unit and encoding information.

Figure 9:
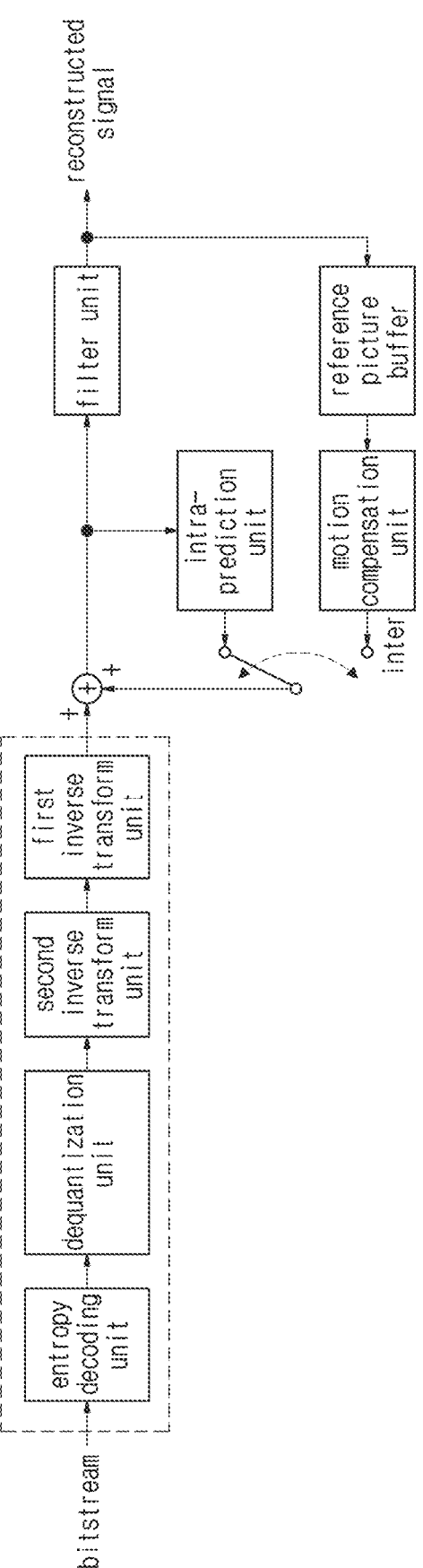
FIG. 9 is a view showing an image decoding apparatus according to an embodiment of the present invention.

FIG. 9 is a view showing an image decoding apparatus according to an embodiment of the present invention.

Referring to FIG. 2 and FIG. 9, an inverse transform unit 230 of FIG. 2 may consist of a first inverse transform unit and a second inverse transform unit.

An entropy decoding unit may perform entropy decoding for an encoded quantization level signal and a bitstream for encoding information transmitted from an encoding apparatus.

An input signal of a dequantization unit may be an entropy-decoded quantization level. A dequantization unit may perform dequantization for an input signal and output a corresponding result.

An input signal of a second inverse transform unit may be an output signal of a dequantization unit. A second inverse transform unit may perform a second inverse transform for an input signal and output a corresponding result. Meanwhile, a second inverse transform unit may skip a second inverse transform and output an input signal as it is.

An input signal of a first inverse transform unit may be an output signal of a second inverse transform unit. A first inverse transform unit may perform a first inverse transform for an input signal and output a corresponding result. Meanwhile, a first inverse transform unit may skip a first inverse transform and output an input signal as it is. An output signal of a first inverse transform unit may be a reconstructed residual signal.

Image encoding/decoding may be performed in a coding block partition unit, and a single coding block partition unit may be divided into a plurality of sub-units.

A single coding block partition unit may be one of a picture, a tile, a slice, a brick, a CTU, and a CU.

A single coding block partition unit may include all the components for expressing an entire image.

For example, a coding block partition unit may include components R, G and B.

For example, a coding block partition unit may include components Y, U and V.

For example, a coding block partition unit may include components Y, Cb and Cr.

For example, a coding block partition unit may include only one component (monochrome).

Components of a coding block partition unit may have different sizes.

For example, a coding block partition unit may be YUV4:2:0.

For example, a coding block partition unit may be YUV4:2:2.

Herein, when each component of a coding block partition unit is partitioned into sub-units, each component may be partitioned into a single partition structure or a multiple partition structure.

A single partition structure may mean that each component has one partition structure while being partitioned into sub-units.

Figure 10:
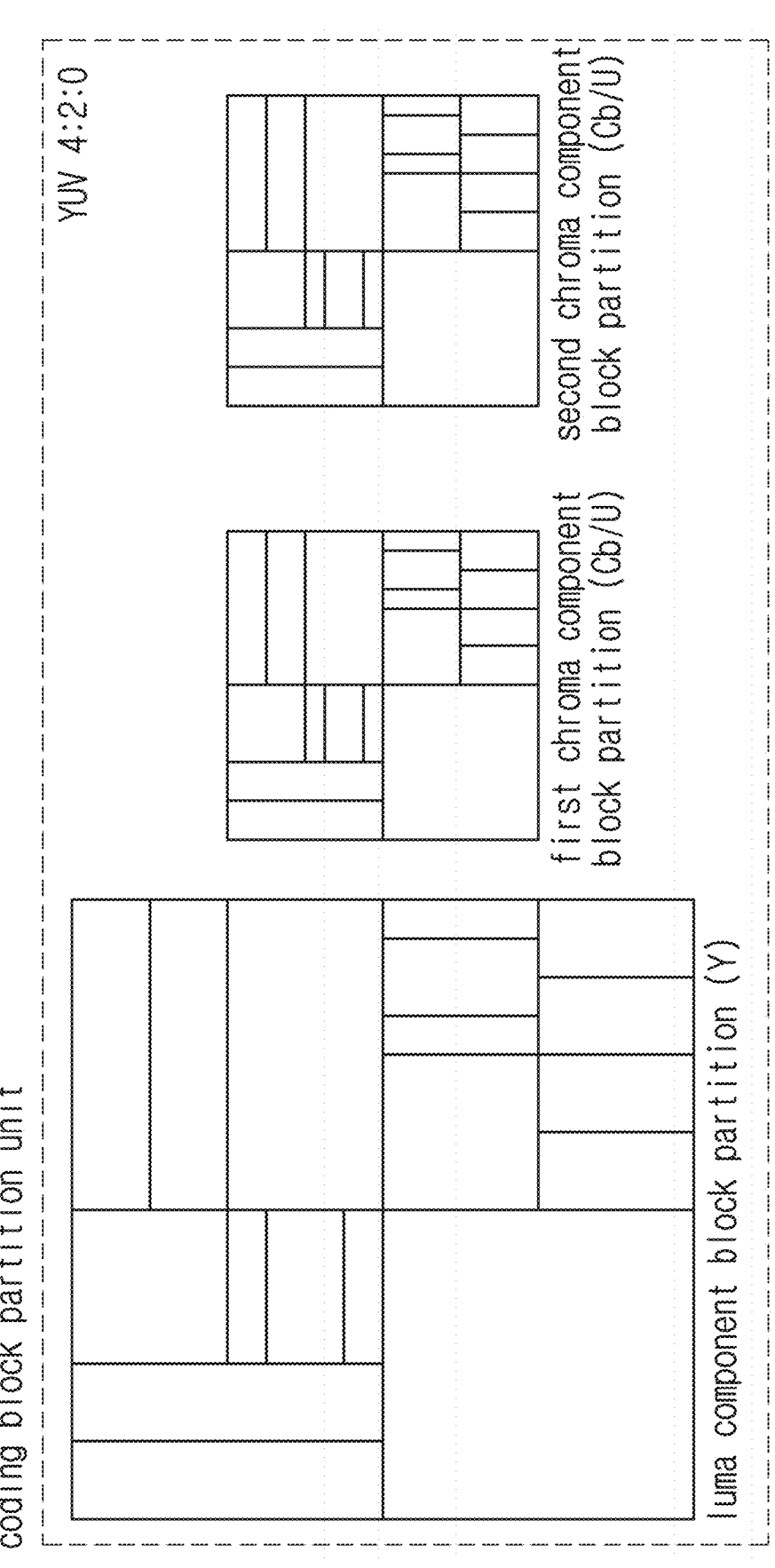
FIG. 10 is a view showing an example of a single partition structure when YUV4:2:0.

FIG. 10 may be an example of a single partition structure when YUV4:2:0.

A multiple partition structure may mean that each component has a different partition structure while being partitioned into sub-units.

For example, when there are three multiple partition structures, components Y, U and V may be partitioned into different partition structures.

For example, there are two multiple partition structures, a luma component (Y) and chroma components (Cb, Cr) may be partitioned into different partition structures.

Figure 11:
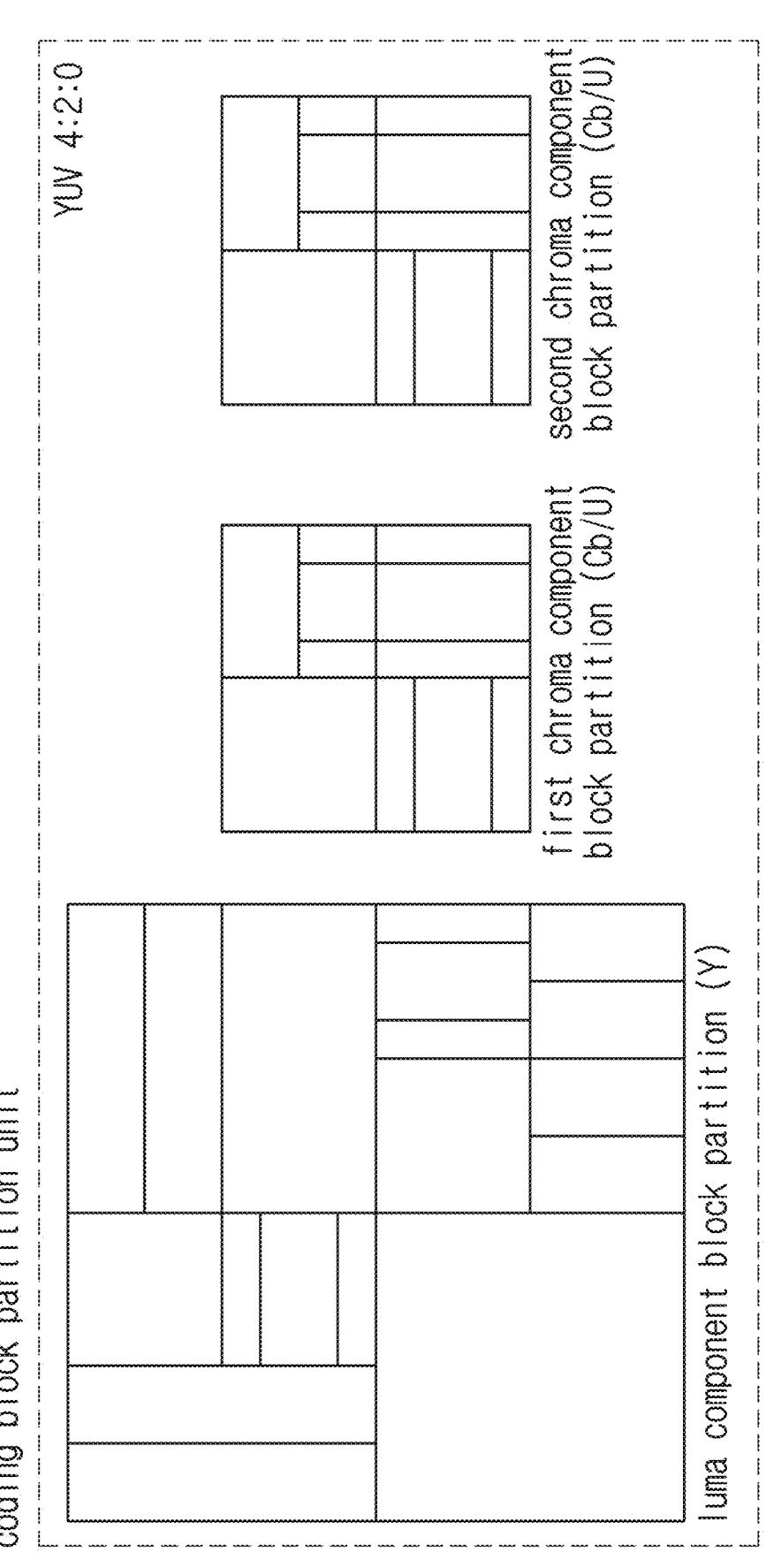
FIG. 11 is a view showing an example of a multiple partition structure when YCbCr4:2:0.

FIG. 11 may be an example of two multiple partition structures when YcbCr4:2:0.

Figure 12:
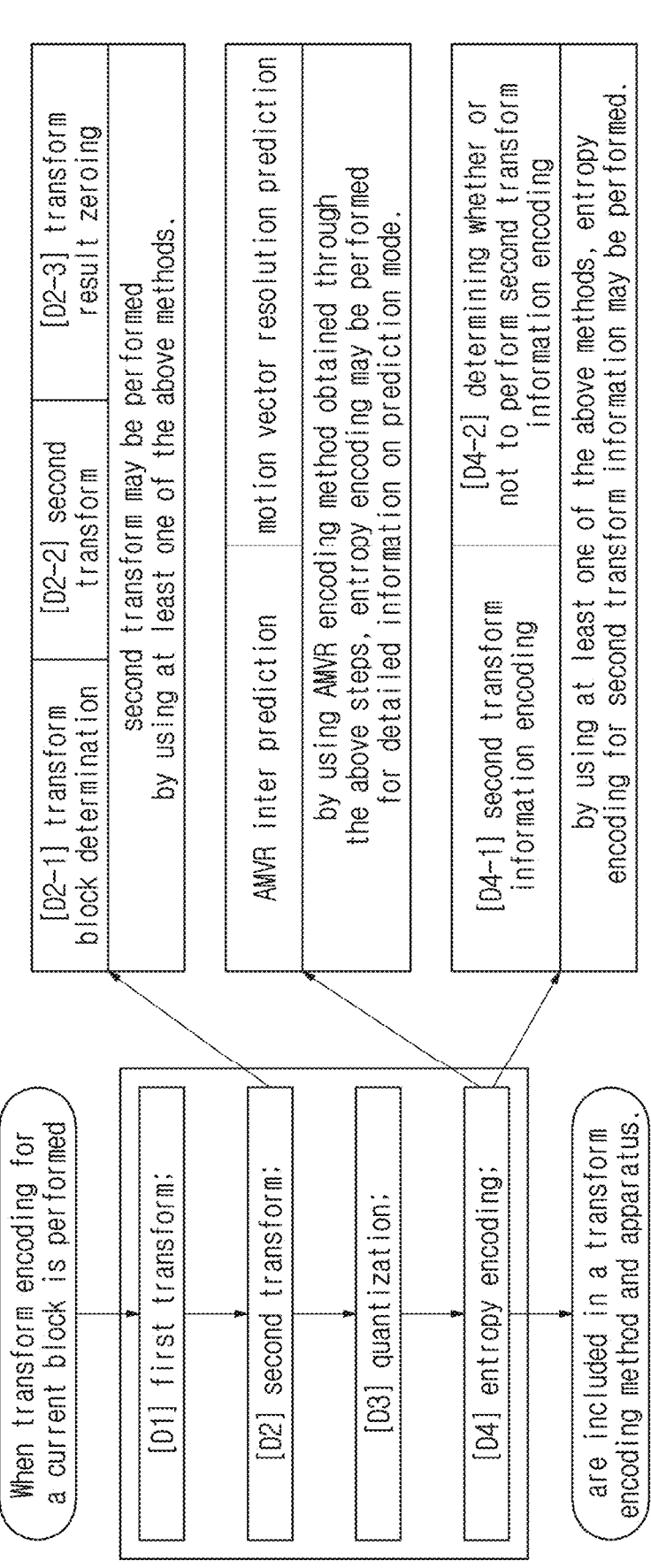
FIG. 12 and FIG. 13 are views for explaining a method of encoding/decoding a residual signal according to an embodiment of the present invention.
Figure 13:
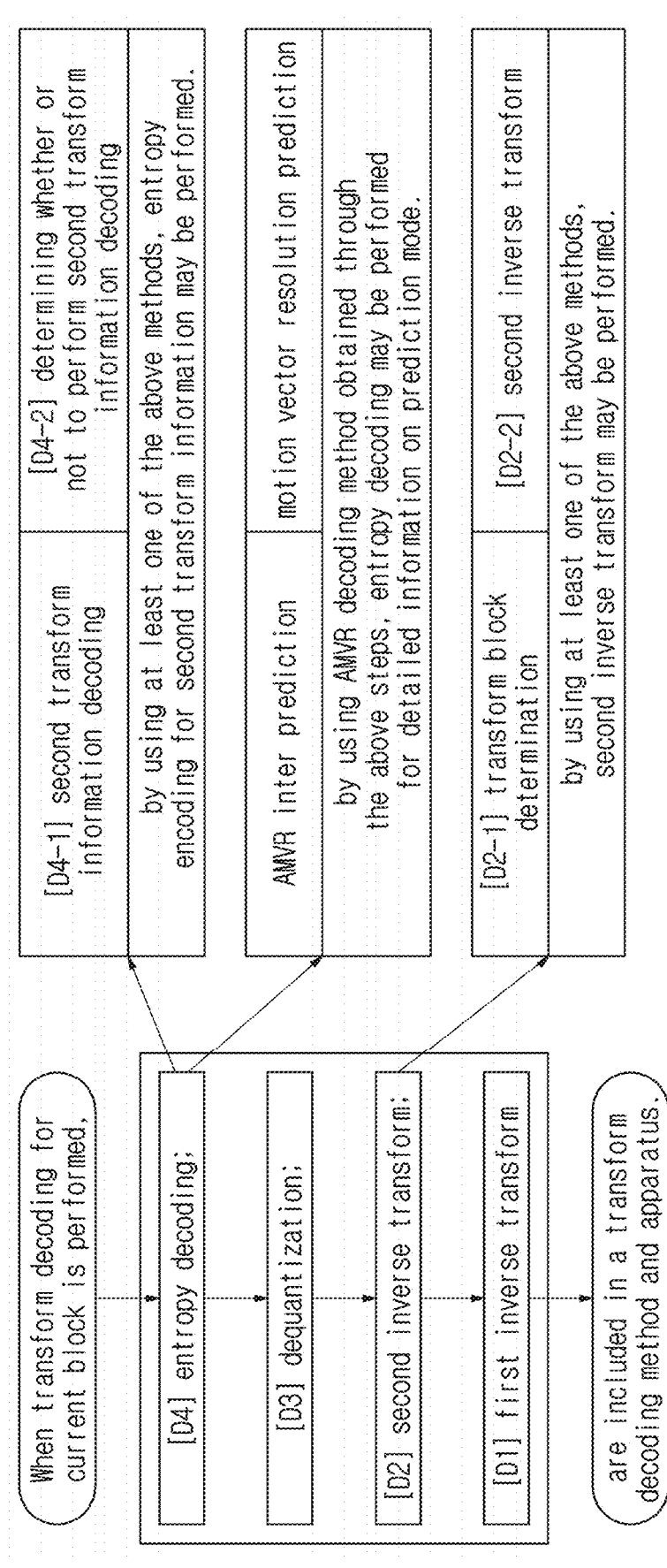

FIG. 12 and FIG. 13 are views for explaining a method of encoding/decoding a residual signal according to an embodiment of the present invention. Hereinafter, referring to FIG. 12 and FIG. 13, an encoding/decoding method for a residual signal will be described. In the description below, a current block may be at least one of a coding block, a sub-coding block, a transform block, and a sub-transform block.

[D1] First Transform/First Inverse Transform Step

When encoding for a current block is performed, first transform may be performed.

In a first transform step, a transform coefficient may be generated by performing a first transform for a residual signal, and the transform coefficient thus generated may be output. Herein, the transform coefficient may be a coefficient value generated by performing transform for a residual block. Alternatively, when a first transform skip mode is applied, a first transform may be skipped and a residual signal may be output as it is. An output of a first transform may be an input of a second transform.

In a first inverse transform step, a residual signal may be output by performing a first inverse transform for a result of a second inverse transform. Alternatively, when a first inverse transform skip mode is applied, a first inverse transform may be skipped and a result of a second inverse transform may be output as it is. Here, an output of the first inverse transform may be a residual signal.

A first transform and a first inverse transform may be performed by using at least one of a plurality of predefined transform schemes. For example, a plurality of predefined transform schemes may include discrete cosine transform (DCT), discrete sine transform (DST), and Karhunen-Loève transform (KLT). The secondary transform may be performed on a transform coefficient that is generated after the primary transform is performed. A transform scheme applied to the primary transform and/or the secondary transform may be determined according to at least one of a coding parameter of a current block and/or a coding parameter of a neighboring block. Alternatively, transform information indicating a transform scheme may be signaled. For example, a DCT-based transform scheme may include DCT-2 and DCT-8. A DST-based transform scheme may include DST-7.

A first transform and a first inverse transform may be performed in a first transform block unit (TB1). Here, a first transform block may be a coding block.

When a current coding block is larger than a maximum first transform size, the current coding block may be binary- or quad-partitioned, thereby configuring a plurality of first transform blocks.

Figure 14:
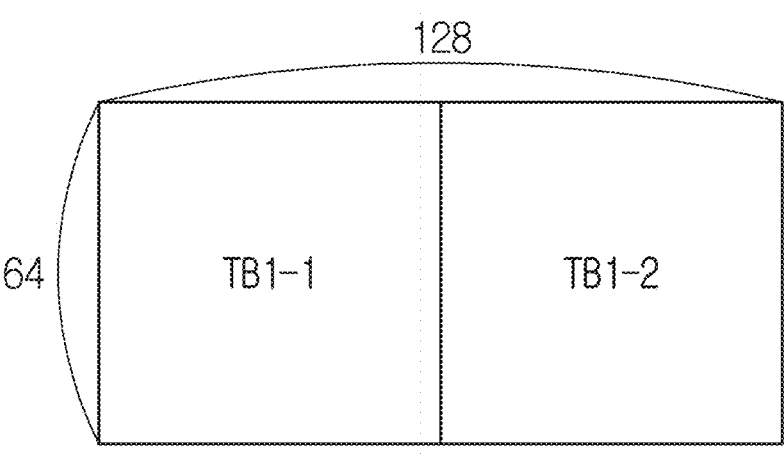
FIG. 14 and FIG. 15 are views showing an example of a primary transform block.

For example, when a current coding block has a size of 128×64 and a maximum first transform size is 64×64, the current coding block may be binary-partitioned, as illustrated in FIG. 14, and first transform blocks (TB1) may be configured.

Figure 15:
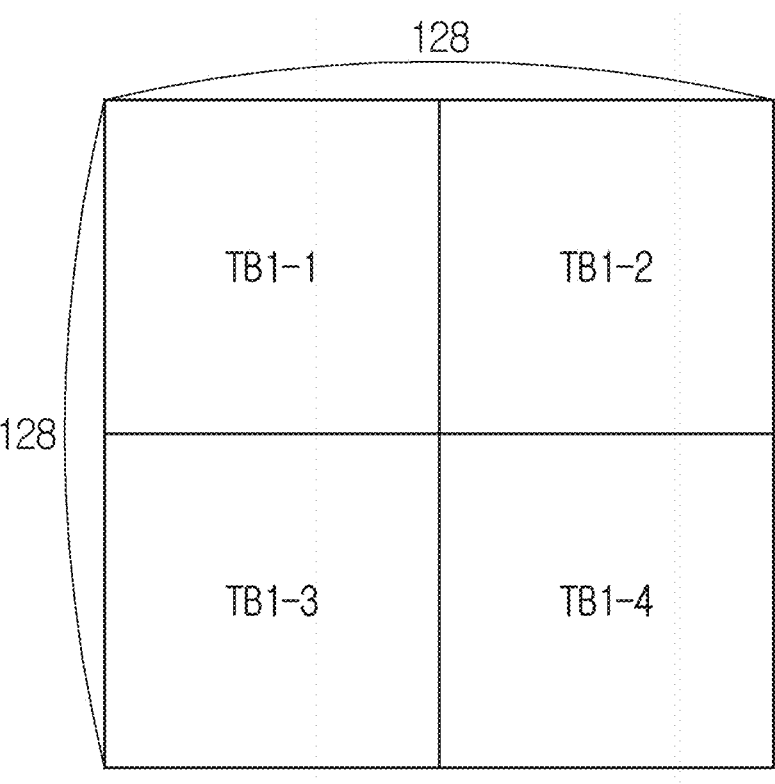

For example, when a current coding block has a size of 128×128 and a maximum first transform size is 64×64, the current coding block may be quad-partitioned, as illustrated in FIG. 15, and first transform blocks (TB1) may be configured.

[D2] Second Transform and Second Inverse Transform Step

When transform encoding/decoding for a current block is performed, a second transform and a second inverse transform may be performed by using at least one of the transform block determination and the second transform/inverse transform and transform result zeroing.

In a second transform step, a second transform coefficient may be generated by performing a second transform for a signal of a first transform signal, and the second transform coefficient thus generated may be output. An output of a second transform may be an input of a quantization step.

In a second inverse transform step, a primary transform coefficient may be output by performing a second inverse transform for a dequantization result. Meanwhile, a second transform and a second inverse transform may be skipped. Here, when a current block is a second transform skip mode, a second transform may be skipped.

According to an embodiment of the present invention, a second transform may be skipped depending on a size of a current block (for example, a horizontal size, a vertical size and an area of a current block).

For example, when a size of a current block is greater than N×N, a second transform may be skipped. Here, N may be 64 or 32.

For example, when a size of a current block is equal to or less than N×N, a second transform may be skipped. Here, N may be 4.

For example, when the larger of a horizontal size and a vertical size of a current block is greater than a predefined value, a second transform may be skipped. Here, the predefined value may be derived based on a maximum transform block size.

According to an embodiment of the present invention, a second transform may be skipped depending on a prediction mode of a current block.

For example, when a current block is an inter-prediction mode, a second transform may be skipped.

For example, when a current block is an intra sub-block partition (ISP) mode, a second transform may be skipped.

For example, when a current block is a matrix based intra prediction (MIP) mode, a second transform may be skipped.

For example, when a current block is an intra block copy (IBC) mode, a second transform may be skipped.

According to an embodiment of the present invention, a second transform may be skipped depending on the first transform information of a current block.

For example, when a current block performs a transform other than DCT-2, a second transform may be skipped.

For example, when a current block is a sub-block transform (SBT) mode, a second transform may be skipped.

For example, when a current block is a first transform skip mode, a second transform may be skipped.

According to an embodiment of the present invention, a second transform may be skipped depending on an image component of a current block.

For example, when an image component of a current block is a chroma signal (Cb/Cr), a second transform for the current block may be skipped.

According to an embodiment of the present invention, a second transform may be skipped depending on a transform block index of a current block. The transform block index may be an index indicating one of sub-transform blocks.

For example, when a transform block index is not 0, a second transform may be skipped.

According to an embodiment of the present invention, a second transform may be skipped without conditions.

Whether or not to perform a second transform may be indicated in a unit of sequence or picture through a high level syntax (HLS).

[D2-1] Transform Block Determination

When a second transform and a second inverse transform for a current block are performed, a second transform block (TB2) may be determined. Here, a second transform block may be a block unit where a second transform or a second inverse transform is performed.

According to an embodiment of the present invention, a second transform block may be performed in a unit of coding block (CB) or first transform block.

For example, a second transform (or a second inverse transform) may be performed in a current coding block unit.

For example, a second transform (or a second inverse transform) may be performed in a first transform block unit.

According to an embodiment of the present invention, a second transform block unit may be a sub-block included in a coding block or a first transform block.

Figure 16:
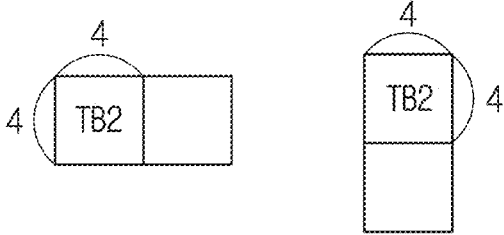
FIGS. 16 to 18 are views showing an example of a secondary transform block unit.

For example, as shown in FIG. 16, a second transform block unit may be the top left 4×4 of a coding block or a first transform block.

Figure 17:
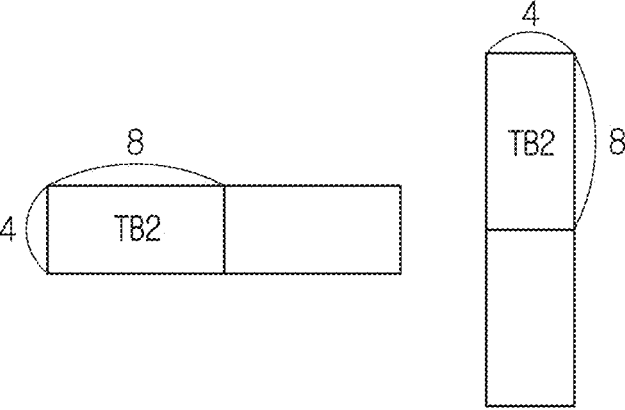

For example, as shown in FIG. 17, a second transform block unit may be the top left 4×8 or 8×4 of a coding block or a first transform block.

For example, a second transform block unit may be the top left 8×8 of a coding block or a first transform block.

Figure 18:
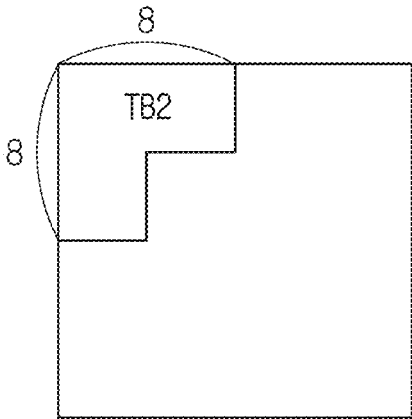

For example, a second transform block unit may be a non-rectangular region on the top left of a coding block or a first transform block. FIG. 18 may be an example of a non-rectangular second transform block.

According to an embodiment of the present invention, a second transform block unit may be adaptively determined depending on the size of a coding block or a first transform block. Herein, N second transform blocks may be determined (N is a positive integer).

For example, when a coding block or a first transform block has a size of 4×4, a second transform block unit may be 4×4.

For example, when a coding block or a first transform block has a size of 4×8 or 8×4, a second transform block unit may be the top left 4×4.

For example, when a coding block or a first transform block has a size of N×4 or 4×N, a second transform block unit may be the top left 8×4 or 4×8. Here, N may be a positive integer equal to or greater than 16.

For example, when a coding block or a first transform block has a size of N×M or M×N, a second transform block unit may be the top left 8×8. Here, N and M may be positive integers satisfying min (N,M)>=8.

For example, when a coding block or a first transform block has a size of N×4 or 4×N, two second transform block units may be two top left 4×4 regions. Here, N may be a positive integer equal to or greater than 16.

According to an embodiment of the present invention, when there is a plurality of first transform blocks in a current coding block, N second transform blocks may be determined in the current coding block (N is a positive integer). Here, N may be equal to or less than the number of first transform blocks in a current coding block.

Figure 19:
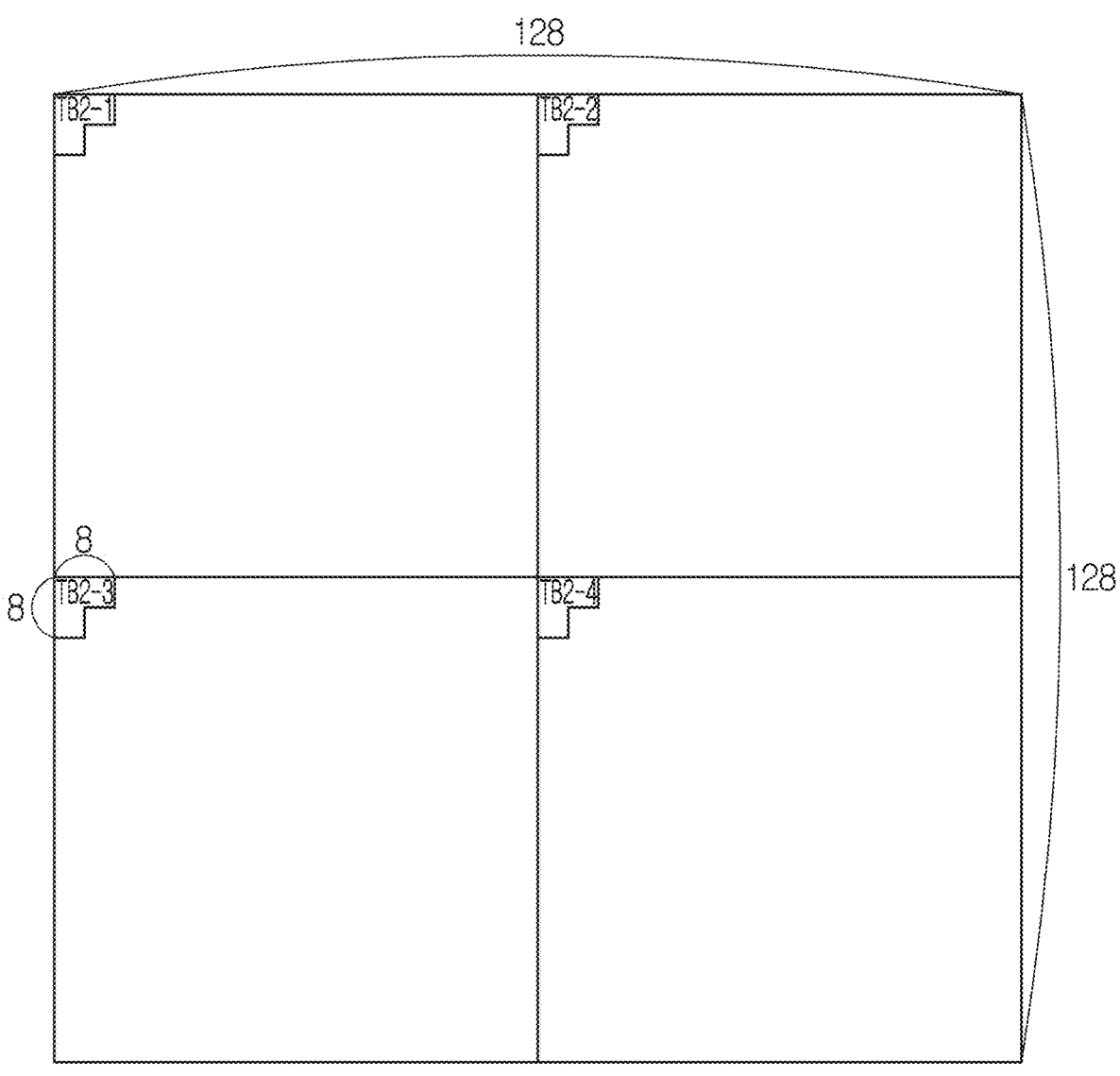
FIG. 19 and FIG. 20 are views showing an example of a secondary transform block.

For example, as shown in FIG. 19, when a coding block with 128×128 size is quad-partitioned into four 64×64 first transform blocks, a second transform block may be determined in each of the first transform blocks.

Figure 20:
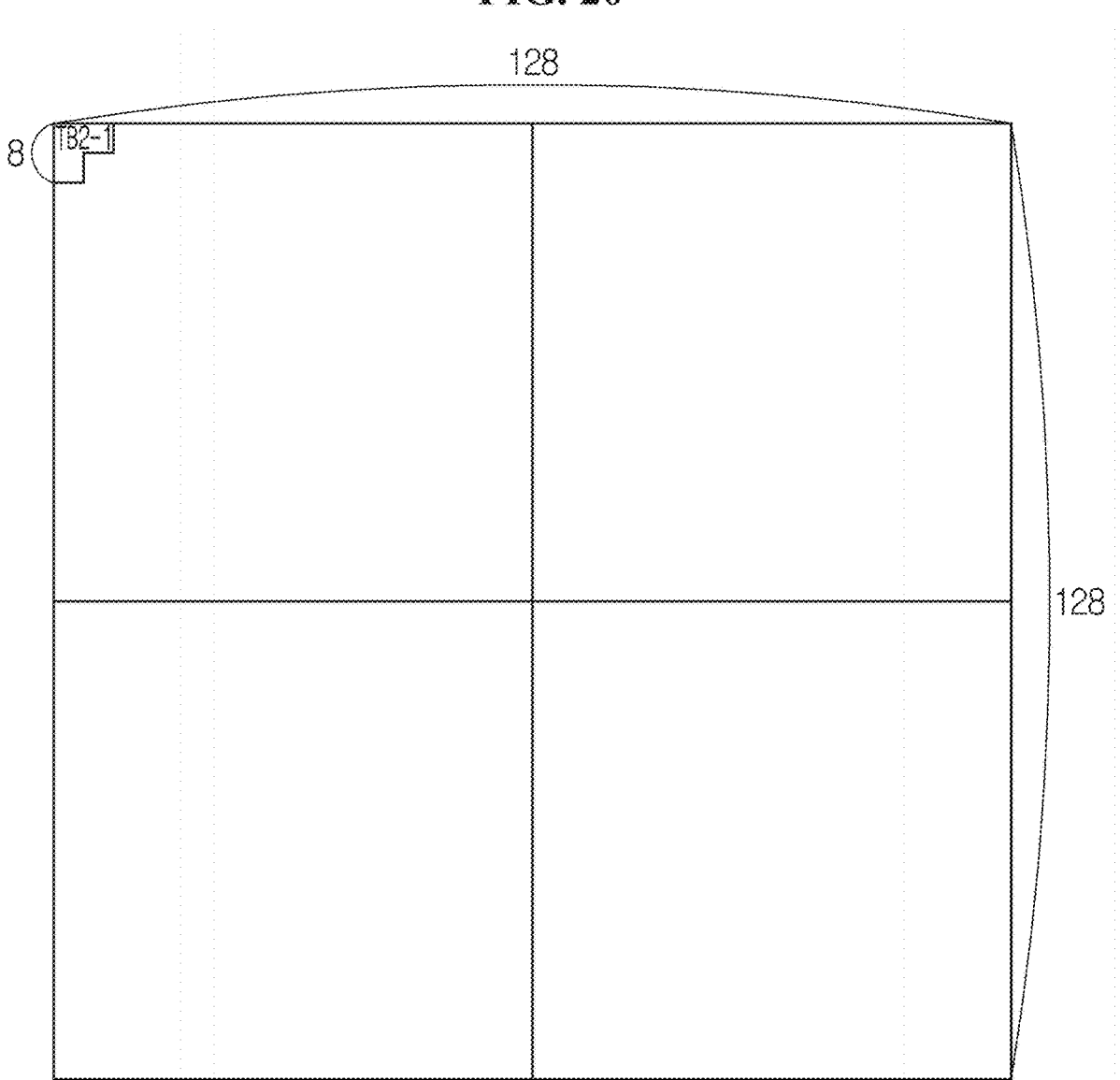

For example, as shown in FIG. 20, when a coding block with 128×128 size is quad-partitioned into four 64×64 first transform blocks, a second transform block may be determined only in the top left first transform block.

[D2-2] Second Transform

A second transform and a second inverse transform may be performed for a current block. A second transform may be performed for a second transform block that is determined in the step D2-1. An input coefficient of a second transform may be a result coefficient of a first transform corresponding to a second transform block.

A second transform input coefficient may be defined as a vector form.

For example, as shown in FIG. 16, an input coefficient of second transform for a second transform block may be 16×1 vector.

For example, as shown in FIG. 17, an input coefficient of second transform for a second transform block may be 32×1 vector.

For example, as shown in FIG. 18, an input coefficient of second transform for a second transform block may be 48×1 vector.

When a second transform is performed, the second transform may be performed through a matrix product of an input coefficient of a second transform and a predefined transform matrix.

According to an embodiment of the present invention, a plurality of transform matrices used for a second transform may be predefined.

According to an embodiment of the present invention, a transform matrix with a specific size may be selected from transform matrices that are predefined according to the vector magnitude of an input coefficient of second transform.

For example, for an input vector with 16×1 size, a 16×16 transform matrix may be selected.

For example, for an input vector with 32×1 size, a 32×32 transform matrix may be selected.

For example, for an input vector with 48×1 size, a 48×48 transform matrix may be selected.

According to an embodiment of the present invention, a transform matrix set with N transform matrices may be defined for a transform matrix with each size according to an intra-prediction mode of a current block. Herein, for a second transform block, index information for an optimal matrix may be signaled among transform matrices of a corresponding transform matrix set.

When a second inverse transform is performed, the second inverse transform may be performed for a second transform block that is determined in D2-1 step. An input coefficient of a second inverse transform may be a result coefficient of dequantization corresponding to a second transform block. Here, an input coefficient of a second inverse transform may be defined as a vector form.

When a second inverse transform is performed, the second inverse transform may be performed through a matrix product of an input coefficient of a second transform and a transposed matrix of a predefined transform matrix.

[D2-3] Transform Result Zeroing

When a second transform and a second inverse transform are performed for a current block, the zeroing of a transform result may be performed.

The zeroing of a transform result may mean replacing a result of a second transform with 0 for a specific region. Here, the transform result zeroing may be adaptively determined according to a size of a current coding block and that of a second transform block.

Figure 21:
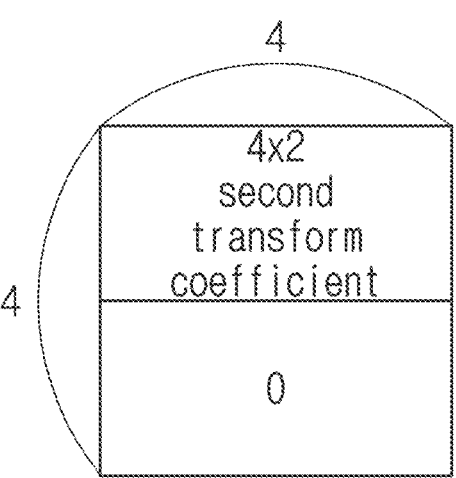

For example, when transform result zeroing is performed for a second transform block with a size of 4×4, it may be performed for a result of a second transform result, as illustrated in FIG. 21.

For example, when transform result zeroing is performed for a second transform block with a size of 4×8 or 8×4, it may be performed for a result of a second transform result, as illustrated in FIG. 22A and FIG. 22B. Here, a size of a current coding block may be 4×N or N×4, and N may be an integer equal to or greater than 16.

Figure 23:
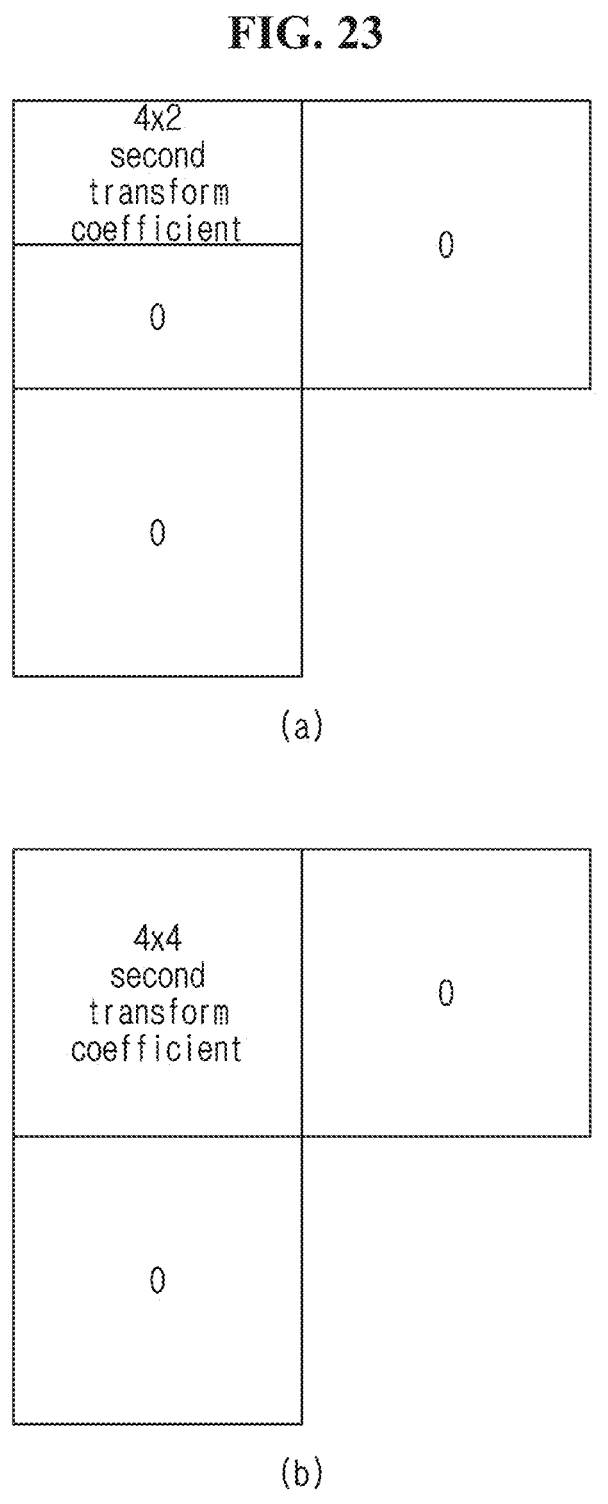

For example, transform result zeroing may be performed for a non-rectangular second transform block. Here, when a current coding block has a size of 8×8, transform result zeroing may be performed as illustrated in FIG. 23A. In addition, when a current coding block has a size equal to or greater than 8×16, 16×8 or 16×16, transform result zeroing may be performed as illustrated in FIG. 23B.

When transform result zeroing is performed, it may be performed through a matrix product of an input vector of a second transform and a reduced second transform matrix.

For example, when transform result zeroing is performed as shown in FIG. 21, a matrix product of an input vector with 16×1 size and a second transform matrix with 8×16 size may be used.

Figure 22:
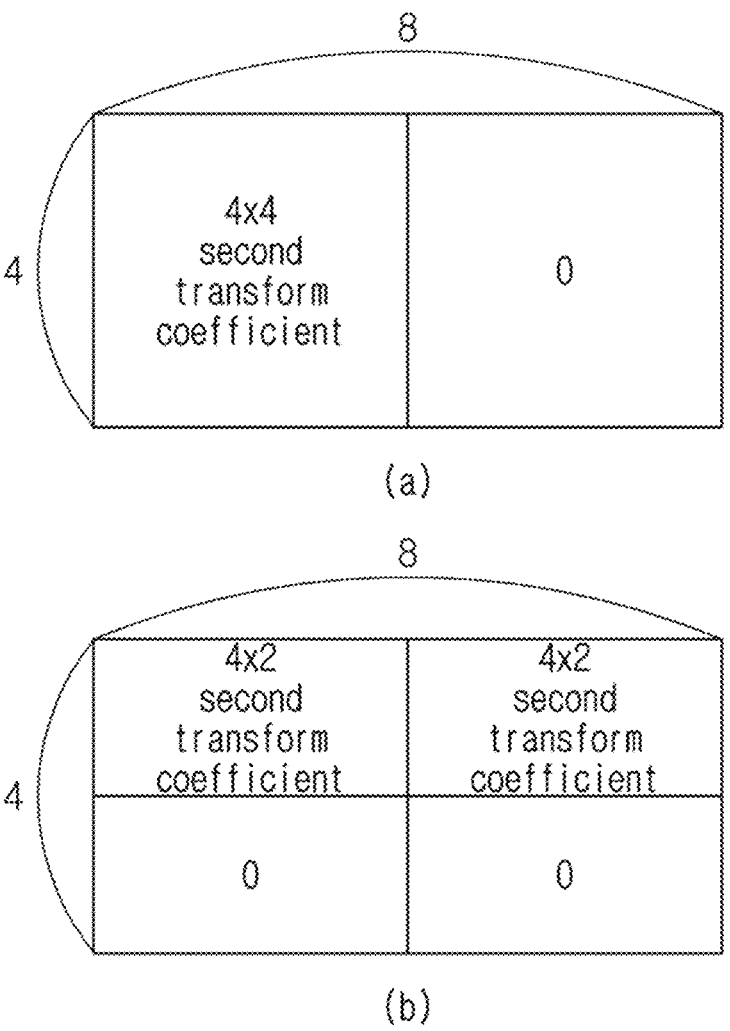

For example, when transform result zeroing is performed as shown in FIG. 22, a matrix product of an input vector with 32×1 size and a second transform matrix with 16×32 size may be used.

For example, when transform result zeroing is performed as shown in FIG. 23A, a matrix product of an input vector with 48×1 size and a second transform matrix with 8×48 size may be used.

For example, when transform result zeroing is performed as shown in FIG. 23B, a matrix product of an input vector with 48×1 size and a second transform matrix with 16×48 size may be used.

When a second inverse transform is performed, the second inverse transform may be performed through a matrix product of an input coefficient of a second transform and a transposed matrix of a predefined reduced transform matrix.

[D3] Quantization and Dequantization Step

When transform encoding/decoding for a current block is performed, quantization and dequantization may be performed.

A quantized level may be generated by performing quantization for a result of a second transform or a residual signal.

A result of a first transform and/or a second transform or a residual signal may be generated by performing dequantization for a quantized level that is configured as an entropy result.

[D4] Entropy Encoding and Decoding Step

When transform encoding and decoding for a current block is performed, entropy encoding/decoding for second transform information may be performed by using at least one of [D4-1] second transform information encoding/decoding and [D4-2] determination of whether or not to perform second transform information encoding/decoding. Here, the second transform information may include a second transform skip mode indicator and second transform matrix index information.

[D4-1] Second Transform Information Encoding/Decoding

When entropy encoding/decoding for a current block is performed, second transform information encoding/decoding may be performed.

According to an embodiment of the present invention, second transform information encoding/decoding may be performed in a step of entropy encoding/decoding in a coding unit.

Figure 24:
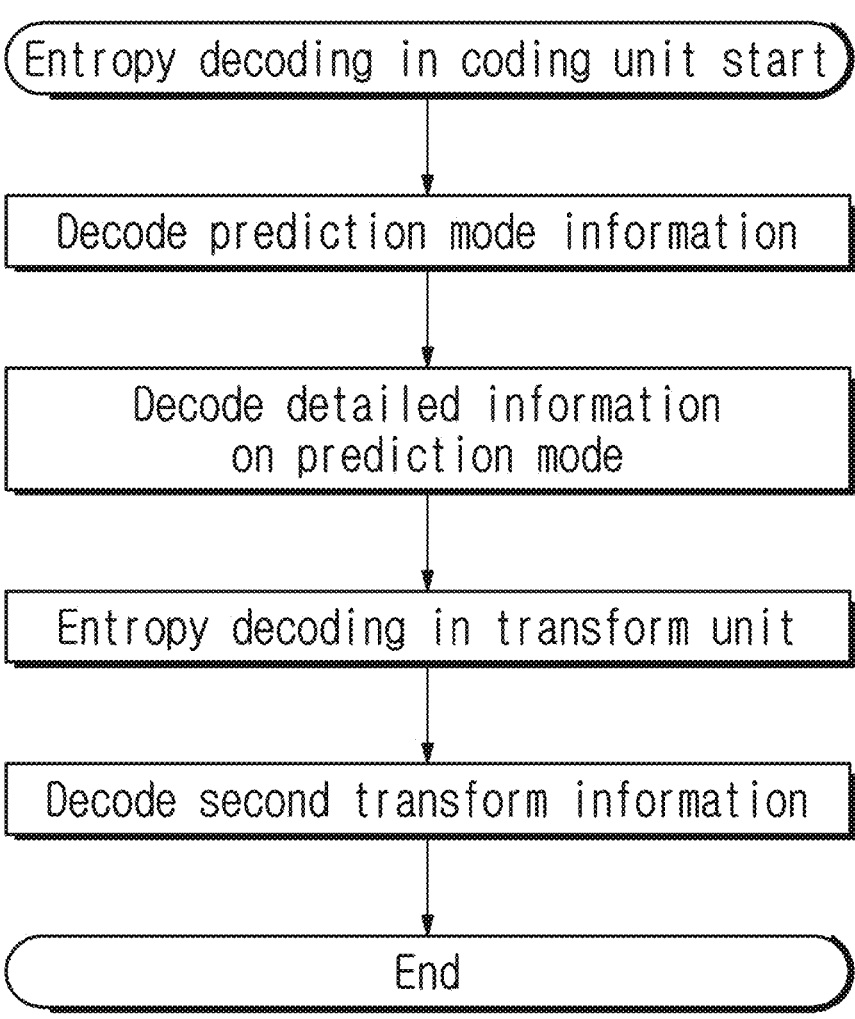
FIGS. 24 to 26 are views for explaining secondary transform information encoding and decoding.

For example, as shown in FIG. 24, single second transform information encoding/decoding may be performed in a coding unit.

According to an embodiment of the present invention, second transform information encoding/decoding may be performed in a step of entropy encoding/decoding in a transform unit.

Figure 25:
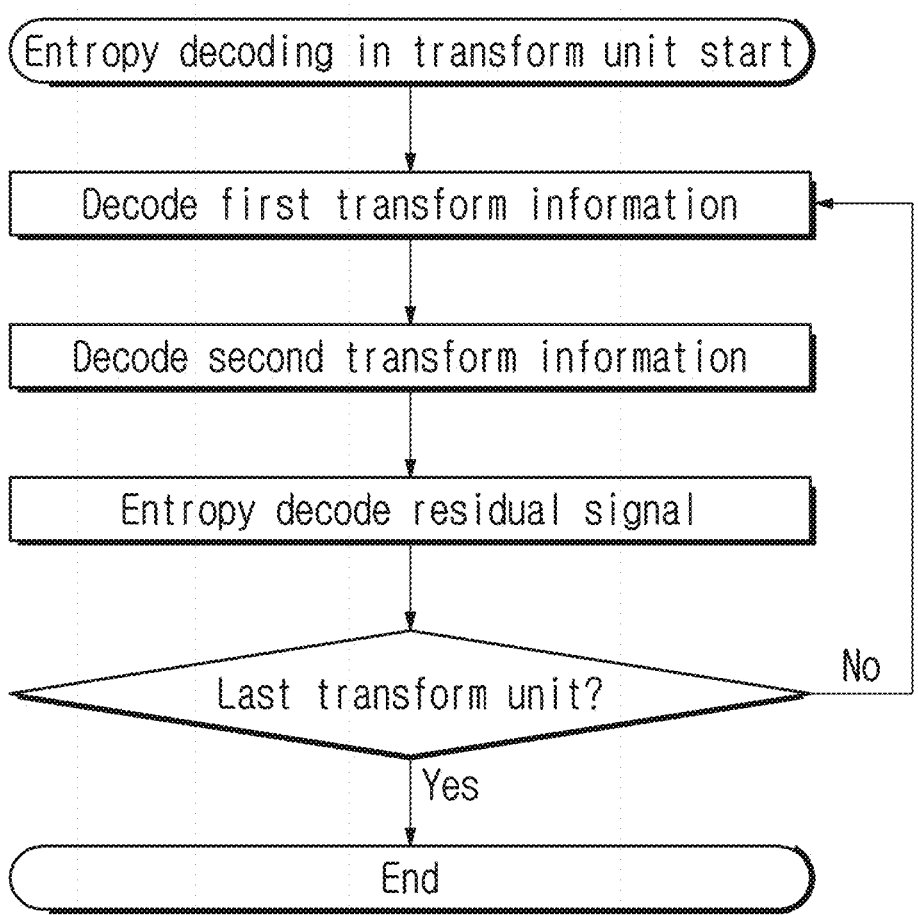

For example, as shown in FIG. 25, second transform information decoding may be performed in a transform unit.

Figure 26:
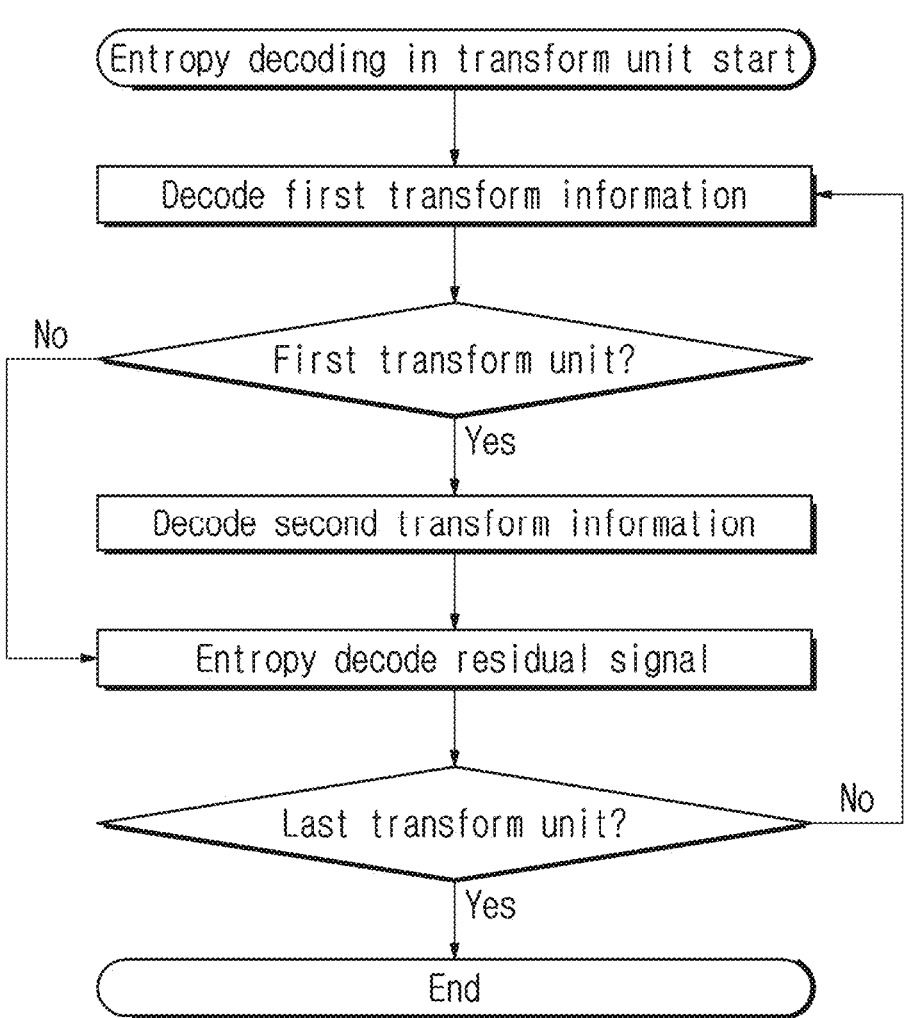

For example, as shown in FIG. 26, second transform information decoding may be performed only in a first second transform unit. In other words, when a plurality of second transform blocks is present in a current coding block, second transform information decoding may be performed only for a first second transform block. Here, in the remaining second transform units, second transform information may be used by being derived from the first second transform unit. Alternatively, second transform may be skipped in the remaining second transform units.

According to an embodiment of the present invention, second transform information encoding and decoding may be differently performed according to an image component and a partition structure (single partition structure or multiple partition structure).

For example, second transform information encoding and decoding may be performed only in a second transform block of a luma component as an image component.

For example, second transform information may be encoded and decoded in a second transform block for a luma component and a chroma component, respectively, as image component.

For example, in a single partition structure, second transform information of a second transform block may be encoded and decoded.

Here, a luma component and a chroma component may share a single piece of second transform information. Alternatively, only a luma component of an image may use second transform information. Here, a second transform of a chroma component may be skipped. Alternatively, second transform information may be encoded and decoded in a second transform block for a luma component and a chroma component, respectively, as image component.

For example, in a multiple partition structure, second transform information of a second transform block may be encoded and decoded.

Here, a luma component and a chroma component may share a single piece of second transform information. Alternatively, only a luma component of an image may use second transform information. Here, a second transform of a chroma component may be skipped. Alternatively, second transform information may be encoded and decoded in a second transform block for a luma component and a chroma component of an image respectively.

[D4-2] Determination of Whether or not to Perform Second Transform Information Encoding/Decoding When entropy encoding/decoding for a current block is performed, whether or not to perform second transform information encoding/decoding may be determined.

According to an embodiment of the present invention, before second transform information encoding/decoding is performed, whether or not to perform transform information encoding/decoding may be determined by confirming a quantization level signal.

For example, when every quantization level signal for a current block is 0, second transform information encoding/decoding may not be performed. In this case, a second transform may be skipped.

For example, when one quantization level signal for a current block is not 0, second transform information encoding/decoding may not be performed. In this case, a second transform may be skipped.

For example, when every quantization level signal for a first transform block is 0, second transform information encoding/decoding may not be performed. In this case, a second transform may be skipped.

For example, when one quantization level signal for a first transform block is not 0, second transform information encoding/decoding may not be performed. In this case, a second transform may be skipped.

For example, when there is one quantization level signal in a zeroing region of a second transform block, second transform information encoding/decoding may not be performed. In this case, a second transform may be skipped.

When entropy encoding for second transform information is performed in a coding unit, a quantization level for considering whether or not to perform second transform information encoding/decoding may be a quantization level signal of a corresponding coding block including all the image components to which every second transform is applied.

Figure 27:
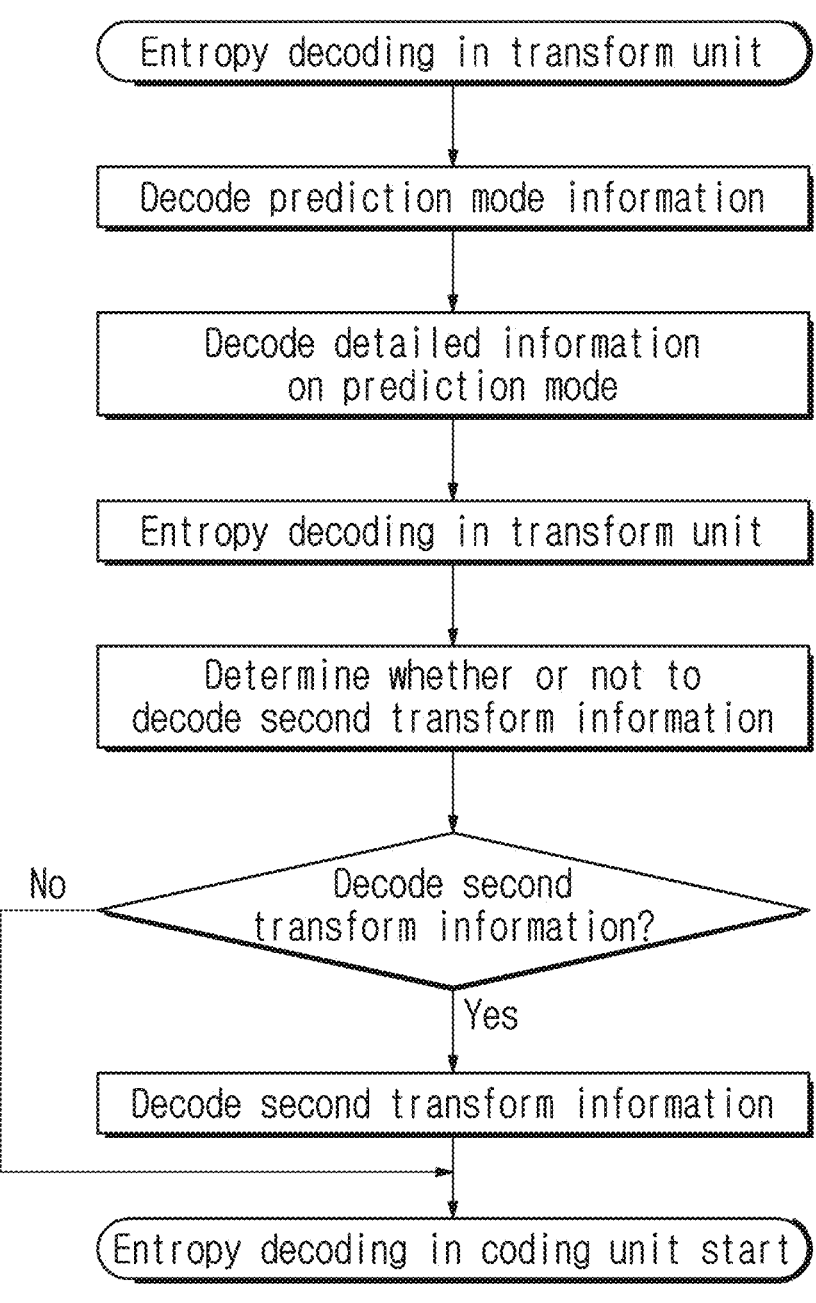
FIGS. 27 to 29 are views for explaining determination of whether or not to perform secondary transform information encoding/decoding.

FIG. 27 may be an example of second transform information decoding in a coding unit including determination of whether or not to perform second transform information encoding/decoding.

When entropy encoding for second transform information is performed in a transform unit, a quantization level for considering whether or not to perform second transform information encoding/decoding may be a quantization level signal of a corresponding transform block including all the image components to which every second transform is applied.

Figure 28:
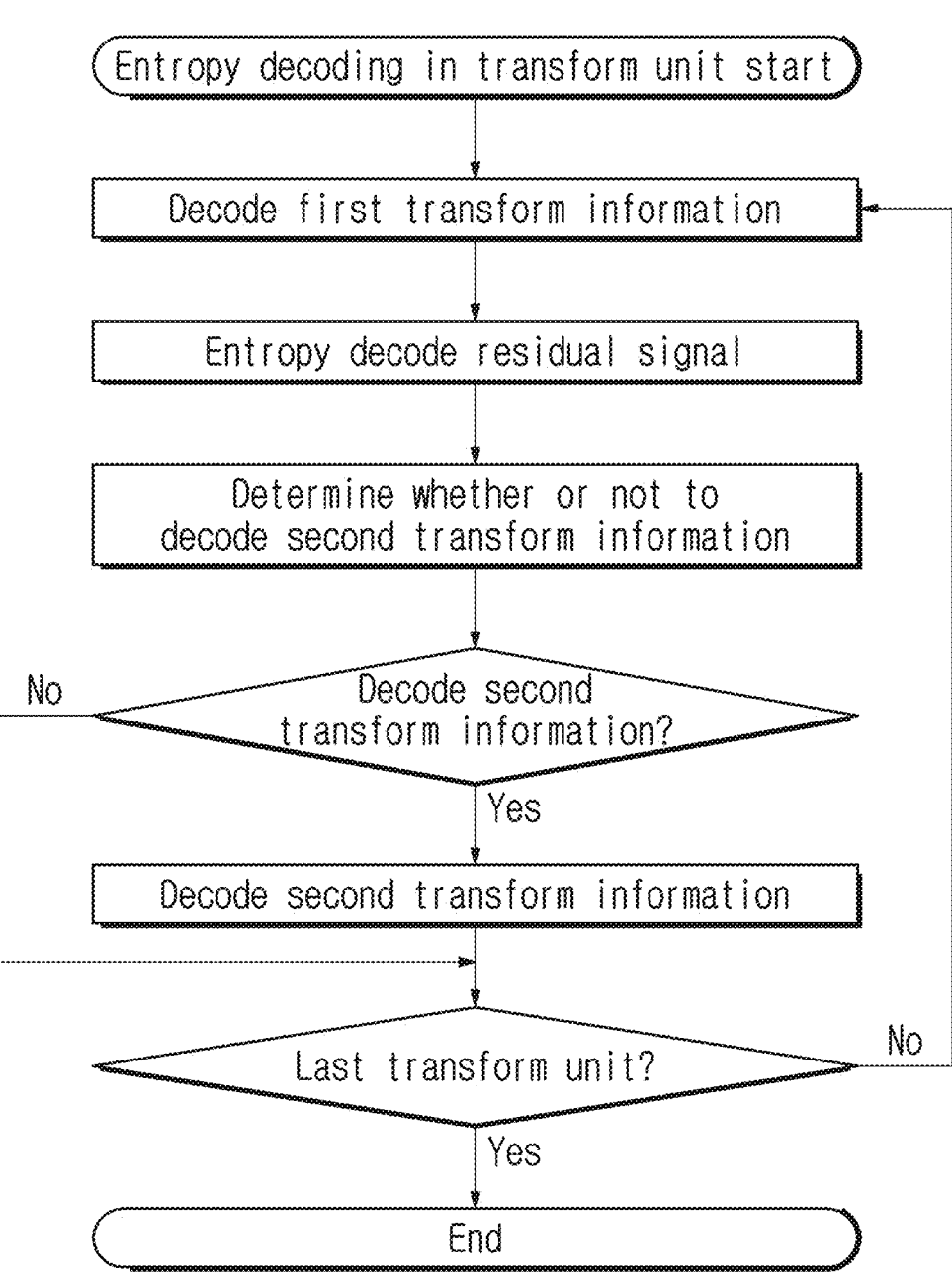
Figure 29:
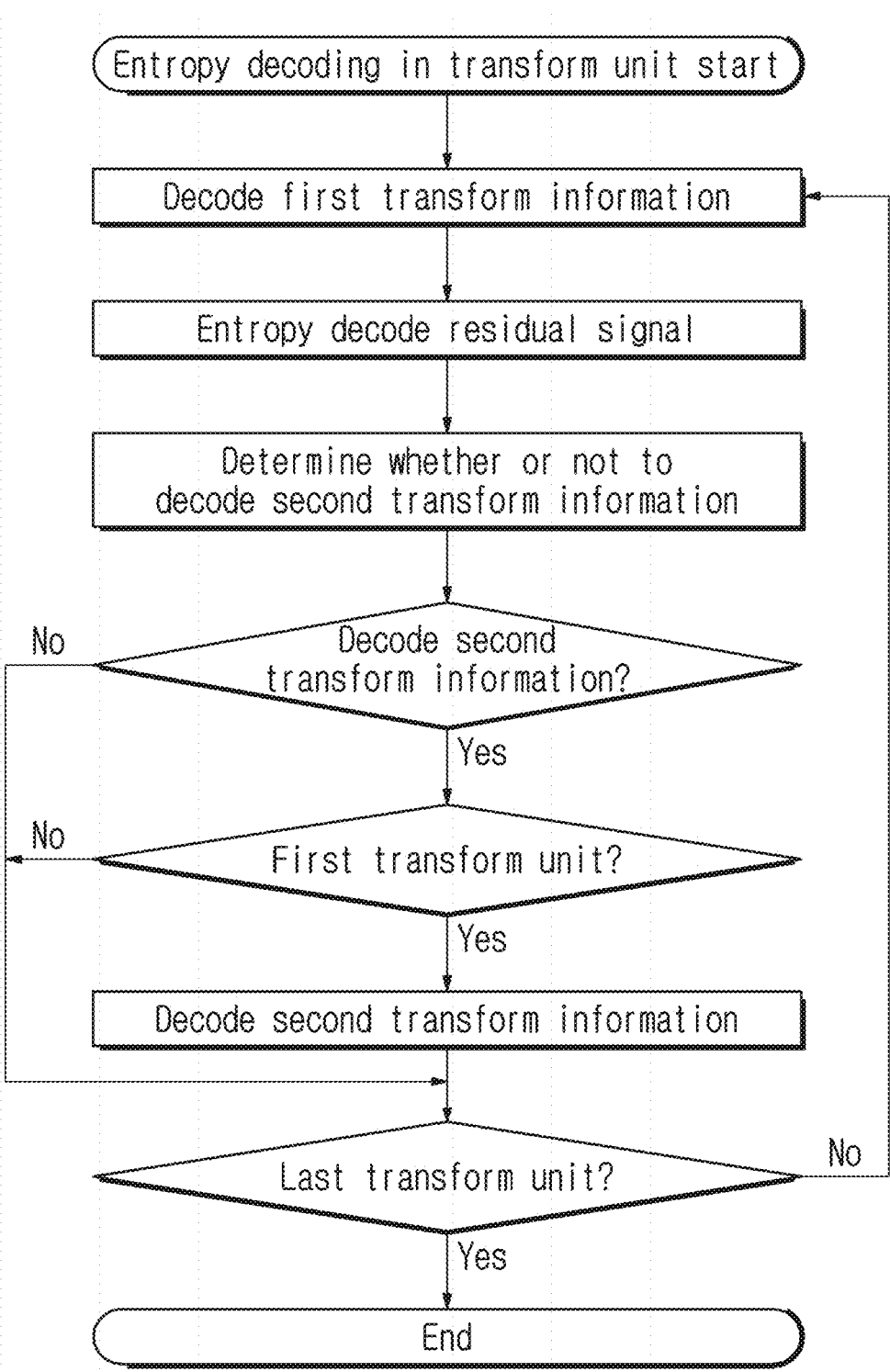

FIG. 28 and FIG. 29 may be an example of second transform information decoding in a transform unit including determination of whether or not to perform second transform information encoding/decoding.

Hereinafter, an adaptive motion vector resolution (AMVR) method, one of the methods used for inter prediction, will be described.

The AMVR method may define a motion vector resolution unit set.

An encoder and a decoder may define N adaptive motion vector resolution unit sets in at least one unit of picture, slice, tile, brick, CTU, CU and PU.

An adaptive motion vector resolution method may be performed in at least one inter-prediction mode of an AMVP mode and an affine mode. Herein, motion vectors of an AMVP mode and an affine mode may be obtained by adding a difference between a motion vector prediction obtained through a neighboring block and a motion vector obtained through optimal inter prediction and search in an encoder to a motion vector predictor. Herein, an optimal cost may be at least one of RD-cost, SAD, SATD, MR-SAD, and MR-SATD.

Motion information to which an adaptive motion vector resolution method is applied may be defined as pre-determined motion information.

Motion information to which an adaptive motion vector resolution method is applied may mean motion information that is obtained through an AMVP mode or an affine mode and is shifted in a resolution unit.

In AMVR method, motion information may be transmitted by using at least one of multiple different resolution units. Here, motion information may include a motion vector (MVx, Mvy), a motion vector predictor (MVPx, MVPy), a reference picture list index, a reference picture index, and a motion vector difference (MVDx, MVDy).

Motion information in AMVR method may have a single reference picture list index as a single piece of motion information.

Motion information in AMVR method may refer to a single reference picture as a single piece of motion information.

A single piece of motion information in AMVR method may have a single motion vector resolution.

In AMVR method, a plurality of motion vectors may have a single motion vector resolution.

In AMVR method, a single motion vector difference may have a single motion vector resolution.

In AMVR method, a plurality of motion vector differences may have a single motion vector resolution.

Meanwhile, an encoder may search for an optimal adaptive motion vector resolution. Herein, an optimal cost may be at least one of RD-cost, SAD, SATD, MR-SAD, and MR-SATD.

When an AMVR method is performed for a current coding block, motion resolution prediction and motion compensation may be performed.

Herein, motion resolution prediction may mean predicting motion information found in an AMVR method in a plurality of different accuracy units. In this case, when accuracy is applied to each piece of motion information, motion information may be efficiently signaled.

When motion resolution prediction for a current block is performed, the following equation may be used.

$$mv=((mv+(1<<(amvr\text{shift}-1))—(mv>=0))>>amvr\text{-}shift)<<amvr\text{shift} \qquad \text{Equation 1}$$

Here, mv may mean a motion vector obtained through an AMVP mode and an affine mode. amvrshift may mean a resolution unit for motion information.

When motion vector resolution prediction for a current block is performed, a resolution set consisting of a plurality of motion vector resolutions may be defined, and motion vector resolution prediction may be performed by using at least one of the defined resolutions.

For example, when a prediction mode of a current block is an AMVP mode, a resolution set of {¼, ½, 1, 4} may be used. In the case of an affine mode, a weight set of {¼, 1/16, 1} may be used.

For example, when a prediction mode of a current block is an AMVP mode, a resolution set of {¼, ½, 1, 4} may be used. In the case of an affine mode, a weight set of {¼, ½, 1/16, 1} may be used.

For example, when a prediction mode of a current block is an AMVP mode, a resolution set of {¼, ½, 1, 4} may be used. In the case of an affine mode, a weight set of {¼, ⅛, 1/16, 1} may be used.

For example, when a prediction mode of a current block is an AMVP mode, a resolution set of {¼, ½, 1, 4} may be used. In the case of an affine mode, a weight set of {¼, 1/16, 1, 2} may be used.

When motion vector resolution prediction for a current block is performed, a resolution that is adaptively derived according to coding information of the current block may be used.

For example, when a prediction mode of a current block is a mode capable of deriving one resolution from a neighboring block, a resolution of the neighboring block may be used as that of the current block.

For example, when a prediction mode of a current block is a mode capable of deriving one resolution from a neighboring block, a resolution may be used as that of the current block.

For example, when a prediction mode of a current block is a mode capable of deriving a plurality of resolutions from a neighboring block, a resolution with the highest frequency among the derived resolution values may be used as that of the current block.

For example, when a prediction mode of a current block is a mode capable of deriving a plurality of weights from a neighboring block, a resolution may be used as a weight of the current block.

Herein, a prediction mode of a current block capable of deriving one weight from a neighboring block may be an AMVP mode, and a mode capable of deriving a plurality of weights may be an affine mode.

When entropy encoding and decoding for a current block is performed, encoding and decoding of detailed information on a prediction mode may be performed. For example, in the step of entropy encoding and decoding in a coding unit, encoding and decoding of detailed information on a prediction mode may be performed. In addition, when encoding and decoding of detailed information on a prediction mode are performed, an adaptive motion vector resolution (AMVR) method may be used.

When entropy encoding and decoding for AMVR prediction information are performed, an AMVR usage flag (for example, amvr_enable_flag) may be transmitted and entropy-encoded/decoded in a higher-level unit.

For example, transmittance and entropy encoding/decoding of an AMVR usage flag may be performed in at least one unit of SPS, PPS, and slice header.

When an AMVR usage flag is 1(on), adaptive motion vector resolution prediction may be performed. When an AMVR usage flag is 0(off), motion vector resolution prediction with a resolution may be applied.

When entropy encoding and decoding for AMVR prediction information are performed, an AMVR flag (for example, amvr_flag) may be transmitted and entropy-encoded/decoded in a specific coding unit.

For example, transmittance and entropy encoding/decoding of an AMVR flag may be performed in at least one unit of picture, sub-picture, slice, tile, brick, CTU, CU, PU, and TU.

When entropy encoding and decoding for AMVR prediction information are performed, an AMVR flag (for example, amvr_flag) may be transmitted and entropy-encoded/decoded in a specific coding unit.

For example, transmittance and entropy encoding/decoding of an AMVR index may be performed in at least one unit of picture, sub-picture, slice, tile, brick, CTU, CU, PU, and TU.

Herein, binarization for an AMVR index may be performed by at least one method among a truncated rice code, a truncated unary code, a k-th order exp_golomb code, and a fixed-length code.

For example, an AMVR index for an AMVP mode may be transmitted and entropy-encoded/decoded by using at least one method among FIGS. 30A, 30B, 30C and 30D.

For example, an AMVR index for an affine mode may be transmitted and entropy-encoded/decoded by using at least one method among FIGS. 31A, 31B, 31C and 31D.

When entropy encoding and decoding for AMVR prediction information are performed, at least one of an AMVR index (for example, amvr_precision_idx), an AMVR flag (for example, amvr_flag), an integer motion vector resolution flag (for example, amvr_integer_flag), and an extra AMVR index (for example, amvr_idx) may be transmitted and entropy-encoded/decoded in a specific coding unit.

For example, transmittance and entropy encoding/decoding of an extra AMVR index may be performed in at least one unit of picture, sub-picture, slice, tile, brick, CTU, CU, PU, and TU.

Herein, binarization for an AMVR index may be performed by at least one method among a truncated rice code, a truncated unary code, a k-th order exp_golomb code, and a fixed-length code.

Herein, an AMVR flag may mean whether or not there is a resolution unit.

Herein, in the case of an AMVP mode, an integer motion vector resolution flag may indicate whether or not a resolution is less than 1.

For example, a resolution set for an AMVP mode may be transmitted and entropy-encoded/decoded as shown in FIG. 32.

For example, a resolution set for an affine mode may be transmitted and entropy-encoded/decoded as shown in FIGS. 33A, 33B and 33C.

When entropy encoding and decoding for AMVR prediction information are performed, regular mode entropy coding and bypass mode entropy coding may be performed for each binary bit.

Here, regular mode entropy coding may mean CABAC coding, and bypass entropy coding may mean bypass coding.

For example, regular mode entropy coding may be performed for an AMVR flag.

For example, bypass mode entropy coding may be performed for an AMVR flag.

For example, bypass mode entropy coding may be performed for an AMVR index.

For example, regular mode entropy coding may be performed for a first binary bit of an AMVR index, and bypass mode entropy coding may be performed for the remaining binary bits.

For example, regular mode entropy coding may be performed for an integer motion vector resolution flag.

For example, bypass mode entropy coding may be performed for an integer motion vector resolution flag.

For example, bypass mode entropy coding may be performed for an extra AMVR index.

FIG. 34 is a flowchart for explaining an image decoding method according to an embodiment of the present invention.

Referring to FIG. 34, a decoder may obtain information on a maximum transform block size (S3401).

In addition, based on the information on a maximum transform block size, a decoder may derive a maximum transform block size (S3402).

For example, the step S3402 of determining whether or not a secondary inverse transform is applied may determine whether or not the secondary inverse transform is applied to the current block on the basis of the larger value of a horizontal size and a vertical size of the current block. More particularly, the step S3402 of determining whether or not a secondary inverse transform is applied may determine that the secondary inverse transform is not applied to the current block, when the larger value of a horizontal size and a vertical size of the current block is greater than the maximum transform block size.

For example, the step S3402 of determining whether or not a secondary inverse transform is applied may determine whether or not the secondary inverse transform is applied to the current block on the basis of primary inverse transform information of the current block. More particularly, the step S3402 of determining whether or not a secondary inverse transform is applied may determine that the secondary inverse transform is not applied to the current block, when the primary inverse transform information of the current block indicates a primary inverse transform skip mode.

In addition, a decoder may determine whether or not a secondary inverse transform is applied to a current block on the basis of a maximum transform block size and a horizontal size and a vertical size of the current block (S3403).

Figure 35:
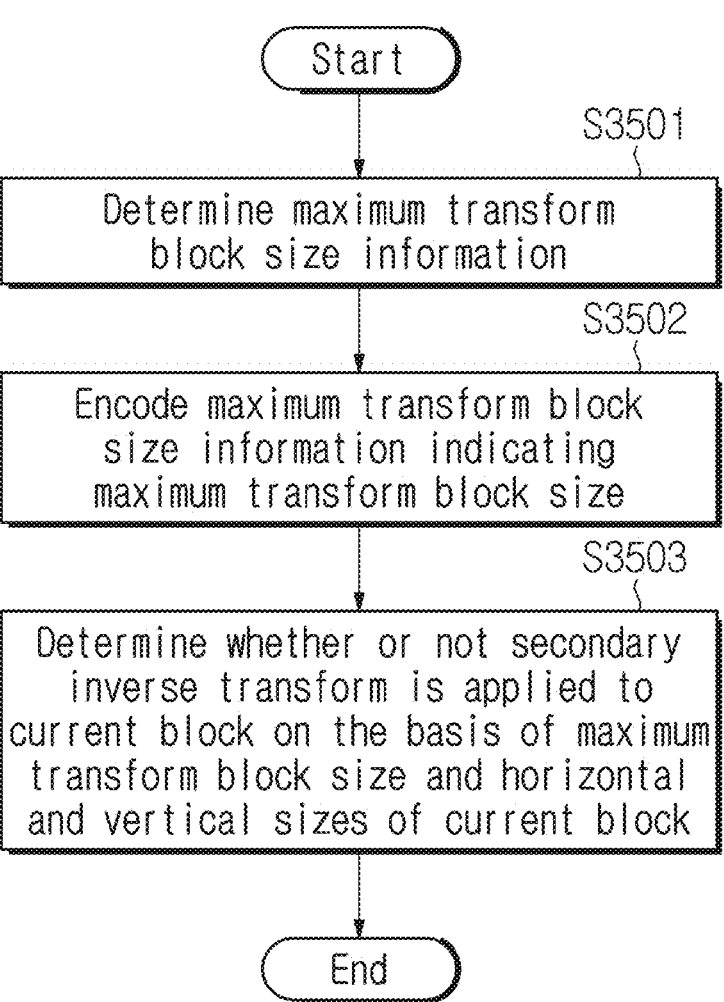
FIG. 35 is a flowchart showing an image encoding method according to an embodiment of the present invention.

FIG. 35 is a flowchart for explaining an image encoding method according to an embodiment of the present invention.

Referring to FIG. 35, an encoder may determine a maximum transform block size (S3501).

In addition, an encoder may encode maximum transform block size information indicating a maximum transform block size (S3502).

In addition, an encoder may determine whether or not a secondary inverse transform is applied to a current block on the basis of a maximum transform block size and a horizontal size and a vertical size of the current block (S3503).

For example, the step S3503 of determining whether or not a secondary inverse transform is applied may determine whether or not the secondary inverse transform is applied to the current block on the basis of the larger value of a horizontal size and a vertical size of the current block. More particularly, the step S3503 of determining whether or not a secondary inverse transform is applied may determine that the secondary inverse transform is not applied to the current block, when the larger value of a horizontal size and a vertical size of the current block is greater than the maximum transform block size.

For example, the step S3503 of determining whether or not a secondary inverse transform is applied may determine whether or not the secondary inverse transform is applied to the current block on the basis of primary inverse transform information of the current block. More particularly, the step S3503 of determining whether or not a secondary inverse transform is applied may determine that the secondary inverse transform is not applied to the current block, when the primary inverse transform information of the current block indicates a primary inverse transform skip mode.

In addition, a non-transitory computer-readable recording medium according to the present invention may store a bitstream generated by an image encoding method according to the present invention. More particularly, in a non-transitory computer-readable recording medium for storing a bitstream generated by an image encoding method, the image encoding method may include: determining a maximum transform block size; encoding maximum transform block size information indicating the maximum transform block size; on the basis of the maximum transform block size and a horizontal size and a vertical size of a current block, determining whether or not a secondary inverse transform is applied to the current block.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

At least one of the syntax elements (flag, index, etc.) entropy-coded in the encoder and entropy-decoded in the decoder may use at least one of the following binarization, debinarization, entropy encoding/decoding methods.

Method of binarization/debinariization of 0-th order Exp_Golomb having a sign (se(v))

Method of binarization/debinarization of k-th order Exp_Golomb having a sign (sek(v))

Method of binarization/debinarization of 0-th order Exp_Golomb of a positive integer without a sign (ue(v))

Method of binarization/debinarization of k-th order Exp_Golomb of a positive integer without a sign (uek(v))

Fixed-length binarization/debinarization method (f(n))

Truncated Rice binarization/debinarization method or Truncated Unary binarization/debinarization method (tu(v))

Truncated Binary binarization/debinarization method (tb(v))

Context adaptive arithmetic encoding/decoding method (ae(v))

Byte-unit bit string (b(8))

Binarization/debinarization method of an integer having a sign (i(n))

Binarization/debinarization method of a positive integer without a sign (u(n))

Unary binarization/debinarization method

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. An image decoding method, the method comprising:
obtaining maximum transform block size information;
deriving a maximum transform block size on the basis of the maximum transform block size information;
determining whether or not a secondary inverse transform is applied to a current block based on the maximum transform block size, and a horizontal size and a vertical size of the current block; and
obtaining first transform coefficients of the current block by performing the secondary inverse transform on second transform coefficients of the current block in response to determination to apply the secondary inverse transform to the current block,
wherein the determining of whether or not the secondary inverse transform is applied comprises determining that the secondary inverse transform is not applied to the current block when a prediction mode of the current block is an inter-prediction mode, and wherein the determining of whether or not the secondary inverse transform is applied comprises determining whether or not the secondary inverse transform is applied to the current block based on primary inverse transform information of the current block indicating whether a primary transform is skipped for the current block.

2. An image encoding method, the method comprising:

determining a maximum transform block size;

encoding maximum transform block size information indicating the maximum transform block size;

determining whether or not a secondary transform is applied to a current block based on the maximum transform block size, and a horizontal size and a vertical size of the current block; and generating second transform coefficients of the current block by performing the secondary transform on first transform coefficients of the current block in response to determination to apply the secondary transform to the current block, wherein the determining of whether or not the secondary transform is applied comprises determining that the secondary transform is not applied to the current block when a prediction mode of the current block is an inter-prediction mode, and wherein the determining of whether or not the secondary transform is applied comprises determining whether or not the secondary transform is applied to the current block based on primary transform information of the current block indicating whether a primary transform is skipped for the current block.

3. A method of transmitting data comprising a bitstream for an image, the method comprising:

obtaining the bitstream for the image; and transmitting the data comprising the bitstream, wherein the bitstream is generated by performing:

determining a maximum transform block size;

encoding maximum transform block size information indicating the maximum transform block size;

determining whether or not a secondary transform is applied to a current block based on the maximum transform block size, and a horizontal size and a vertical size of the current block; and generating second transform coefficients of the current block by performing the secondary transform on first transform coefficients of the current block in response to determination to apply the secondary transform to the current block, wherein the determining of whether or not the secondary inverse transform is applied comprises determining that the secondary inverse transform is not applied to the current block when a prediction mode of the current block is an inter-prediction mode, and wherein the determining of whether or not the secondary transform is applied comprises determining whether or not the secondary transform is applied to the current block based on primary transform information of the current block indicating whether a primary transform is skipped for the current block.

\* \* \* \* \*